(12) United States Patent
Lee et al.

(10) Patent No.: US 10,073,595 B2
(45) Date of Patent: *Sep. 11, 2018

(54) APPARATUS AND METHOD FOR TURNING E-BOOK PAGES IN PORTABLE TERMINAL

(75) Inventors: Sung-Min Lee, Seoul (KR);
Dal-Kwang Lee, Yongin-si (KR);
Chul-Hwan Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 221 days.

This patent is subject to a terminal disclaimer.

(21) Appl. No.: 13/232,431

(22) Filed: Sep. 14, 2011

(65) Prior Publication Data
US 2012/0084702 A1 Apr. 5, 2012

(30) Foreign Application Priority Data

Oct. 1, 2010 (KR) .................. 10-2010-0095815
Dec. 28, 2010 (KR) .................. 10-2010-0136624

(51) Int. Cl.
*G06F 3/0483* (2013.01)
*G06F 3/0488* (2013.01)

(52) U.S. Cl.
CPC ........ *G06F 3/0483* (2013.01); *G06F 3/04883* (2013.01)

(58) Field of Classification Search
CPC .. G06F 15/0291; G06F 3/0483; G06F 3/0488; G06F 2203/04803; G06F 2203/048; G06F 3/0481; G06F 3/0482; G06F 3/0486; G06F 3/04886
USPC ........................................ 715/702, 776, 863
See application file for complete search history.

(56) References Cited

U.S. PATENT DOCUMENTS

| | | | |
|---|---|---|---|
| 5,463,725 A | 10/1995 | Henckel et al. | |
| 5,787,295 A | 7/1998 | Nakao | |
| 6,300,933 B1 | 10/2001 | Nagasaki et al. | |
| 6,448,986 B1 | 9/2002 | Smith | |
| 6,741,268 B1 | 5/2004 | Hayakawa | |
| 6,765,559 B2 * | 7/2004 | Hayakawa | 345/173 |
| 6,788,292 B1 | 9/2004 | Nako et al. | |
| 6,957,233 B1 | 10/2005 | Beezer et al. | |

(Continued)

FOREIGN PATENT DOCUMENTS

| | | |
|---|---|---|
| CN | 1688962 A | 10/2005 |
| CN | 1854992 A | 11/2006 |

(Continued)

OTHER PUBLICATIONS

Office Action dated Jan. 2, 2014 in connection with U.S. Appl. No. 13/232,493, 21 pages.

(Continued)

*Primary Examiner* — Amy M Levy

(57) ABSTRACT

An apparatus and method support intuitive gestures for turning electronic book (e-book) pages in a portable terminal. The portable terminal executes an e-book and determines whether a just preceding page gesture is input, the just preceding page gesture comprising a first contact that starts to the left of a right-side user interface (UI) activation region of the e-book, followed by a drag toward the right while maintaining the first contact and releasing the first contact. When the just preceding page gesture is input, the just preceding page is displayed on a screen.

4 Claims, 15 Drawing Sheets

(56) References Cited

U.S. PATENT DOCUMENTS

| | | | |
|---|---|---|---|
| 6,989,815 B2 | 1/2006 | Liang et al. | |
| 6,992,687 B1 | 1/2006 | Baird et al. | |
| 7,032,187 B2 | 4/2006 | Keely, Jr. et al. | |
| 7,069,518 B2 | 6/2006 | Card et al. | |
| 7,185,274 B1 | 2/2007 | Rubin et al. | |
| 7,249,324 B2 | 7/2007 | Nakamura et al. | |
| 7,289,102 B2 | 10/2007 | Hinckley et al. | |
| 7,519,468 B2 | 4/2009 | Orr et al. | |
| 7,555,724 B2 * | 6/2009 | Ho | 715/776 |
| 7,574,669 B1 | 8/2009 | Braun et al. | |
| 7,714,837 B2 * | 5/2010 | Hsieh | 345/156 |
| 7,760,183 B2 | 7/2010 | Grady et al. | |
| 7,898,541 B2 * | 3/2011 | Hong et al. | 345/473 |
| 8,046,030 B2 | 10/2011 | Dunko | |
| 8,228,292 B1 | 7/2012 | Ruiz et al. | |
| 8,284,167 B2 | 10/2012 | Li et al. | |
| 8,479,122 B2 | 7/2013 | Hotelling et al. | |
| 8,499,251 B2 | 7/2013 | Petschnigg et al. | |
| 8,707,174 B2 | 4/2014 | Hinckley et al. | |
| 8,799,765 B1 | 8/2014 | Macinnis et al. | |
| 8,866,741 B2 | 10/2014 | Cho et al. | |
| 8,935,627 B2 * | 1/2015 | Ryu | G06F 3/0483 345/173 |
| 9,026,932 B1 * | 5/2015 | Dixon | G06F 3/04883 715/702 |
| 9,223,475 B1 * | 12/2015 | Kim | G06F 3/0483 |
| 2001/0024195 A1 | 9/2001 | Hayakawa | |
| 2002/0011990 A1 | 1/2002 | Anwar | |
| 2002/0036618 A1 * | 3/2002 | Wakai | G06F 3/017 345/157 |
| 2002/0143489 A1 | 10/2002 | Orchard | |
| 2002/0167481 A1 | 11/2002 | Wong et al. | |
| 2002/0184189 A1 * | 12/2002 | Hay et al. | 707/1 |
| 2003/0020687 A1 * | 1/2003 | Sowden et al. | 345/157 |
| 2003/0048305 A1 | 3/2003 | Liang et al. | |
| 2003/0206189 A1 | 11/2003 | DeMello et al. | |
| 2004/0006737 A1 | 1/2004 | Colbath et al. | |
| 2004/0008970 A1 | 1/2004 | Junkersfeld et al. | |
| 2004/0039750 A1 * | 2/2004 | Anderson et al. | 707/103 R |
| 2004/0125081 A1 | 7/2004 | Hayakawa | |
| 2004/0135770 A1 | 7/2004 | Hayasaka | |
| 2004/0143796 A1 | 7/2004 | Lerner et al. | |
| 2004/0236774 A1 * | 11/2004 | Baird et al. | 707/100 |
| 2005/0005246 A1 | 1/2005 | Card et al. | |
| 2005/0108233 A1 | 5/2005 | Metsatahti et al. | |
| 2005/0184956 A1 | 8/2005 | Wong et al. | |
| 2006/0010396 A1 | 1/2006 | Beezer et al. | |
| 2006/0026251 A1 | 2/2006 | Cheng et al. | |
| 2006/0026521 A1 * | 2/2006 | Hotelling et al. | 715/702 |
| 2006/0050054 A1 | 3/2006 | Liang et al. | |
| 2006/0125803 A1 * | 6/2006 | Westerman et al. | 345/173 |
| 2006/0277478 A1 | 12/2006 | Seraji et al. | |
| 2007/0061755 A1 * | 3/2007 | Taboada et al. | 715/818 |
| 2007/0085845 A1 | 4/2007 | Kikuchi et al. | |
| 2007/0164993 A1 | 7/2007 | Kao et al. | |
| 2007/0188450 A1 | 8/2007 | Hernandez et al. | |
| 2007/0290999 A1 | 12/2007 | Cho et al. | |
| 2008/0036743 A1 | 2/2008 | Grady et al. | |
| 2008/0040692 A1 | 2/2008 | Sunday et al. | |
| 2008/0074399 A1 | 3/2008 | Lee | |
| 2008/0211685 A1 | 9/2008 | Grady et al. | |
| 2008/0222552 A1 | 9/2008 | Batarseh et al. | |
| 2008/0243828 A1 | 10/2008 | Reztlaff et al. | |
| 2008/0288887 A1 | 11/2008 | Wong et al. | |
| 2009/0064027 A1 | 3/2009 | Navas Cadena et al. | |
| 2009/0237367 A1 * | 9/2009 | Ryu et al. | 345/173 |
| 2009/0262074 A1 | 10/2009 | Nasiri et al. | |
| 2009/0271703 A1 * | 10/2009 | Chu | G06F 3/04883 715/702 |
| 2009/0271731 A1 | 10/2009 | Lin et al. | |
| 2009/0271783 A1 | 10/2009 | Hsieh et al. | |
| 2010/0045616 A1 | 2/2010 | Li et al. | |
| 2010/0060475 A1 | 3/2010 | Choi | |
| 2010/0060664 A1 | 3/2010 | Kilpatrick, II et al. | |
| 2010/0088641 A1 | 4/2010 | Choi | |
| 2010/0117975 A1 | 5/2010 | Cho | |
| 2010/0134412 A1 | 6/2010 | Narita | |
| 2010/0164888 A1 | 7/2010 | Okumura et al. | |
| 2010/0175018 A1 | 7/2010 | Petschnigg et al. | |
| 2010/0295790 A1 | 11/2010 | Yu | |
| 2011/0010617 A1 | 1/2011 | Kim et al. | |
| 2011/0047460 A1 | 2/2011 | Choe | |
| 2011/0050591 A1 * | 3/2011 | Kim et al. | 345/173 |
| 2011/0099513 A1 | 4/2011 | Ameline | |
| 2011/0153330 A1 | 6/2011 | Yazdani et al. | |
| 2011/0163955 A1 | 7/2011 | Nasiri et al. | |
| 2011/0167384 A1 | 7/2011 | Yabu et al. | |
| 2011/0209039 A1 | 8/2011 | Hinckley et al. | |
| 2011/0209057 A1 * | 8/2011 | Hinckley et al. | 715/702 |
| 2011/0210932 A1 | 9/2011 | Ryu et al. | |
| 2011/0296334 A1 | 12/2011 | Ryu et al. | |
| 2011/0298762 A1 | 12/2011 | Lin | |
| 2011/0316888 A1 | 12/2011 | Sachs et al. | |
| 2012/0017167 A1 | 1/2012 | Lee et al. | |
| 2012/0047470 A1 * | 2/2012 | Martinoli | G06F 3/0483 715/863 |
| 2012/0066581 A1 | 3/2012 | Spalink | |
| 2012/0066591 A1 * | 3/2012 | Hackwell | 715/702 |
| 2012/0075327 A1 | 3/2012 | Mackenzie | |
| 2012/0089938 A1 | 4/2012 | Homma et al. | |
| 2012/0105464 A1 | 5/2012 | Franceus | |
| 2012/0124505 A1 * | 5/2012 | St. Jacques, Jr. | G06F 3/0483 715/776 |
| 2012/0127109 A1 | 5/2012 | Nishio et al. | |
| 2012/0154293 A1 | 6/2012 | Hinckley et al. | |
| 2012/0154294 A1 | 6/2012 | Hinckley et al. | |
| 2012/0159373 A1 | 6/2012 | Archer et al. | |
| 2012/0188154 A1 | 7/2012 | Lee | |
| 2012/0311438 A1 * | 12/2012 | Cranfill et al. | 715/256 |
| 2013/0219321 A1 | 8/2013 | Cranfill et al. | |
| 2013/0298067 A1 | 11/2013 | Parker et al. | |

FOREIGN PATENT DOCUMENTS

| | | |
|---|---|---|
| CN | 101082837 A | 12/2007 |
| CN | 101582007 A | 11/2009 |
| CN | 10-1655766 A | 2/2010 |
| CN | 201491069 A | 5/2010 |
| CN | 101794191 | 8/2010 |
| CN | 201576359 U | 9/2010 |
| EP | 2104026 A2 | 10/2008 |
| EP | 2000894 A2 | 12/2008 |
| JP | H 06-231186 A | 8/1994 |
| JP | H 10161619 A | 6/1998 |
| JP | 2000-123044 A | 4/2000 |
| JP | 2000-163193 A | 6/2000 |
| JP | 2000-242390 A | 9/2000 |
| JP | 2002-082878 A | 3/2002 |
| JP | 2002140159 A | 5/2002 |
| JP | 2002341991 A | 11/2002 |
| JP | 2003-140802 A | 5/2003 |
| JP | 2003157134 A | 5/2003 |
| JP | 2004-288208 A | 10/2004 |
| JP | 2004-355106 A | 12/2004 |
| JP | 2005165760 A | 6/2005 |
| JP | 2006-053605 A | 2/2006 |
| JP | 2007310888 A | 11/2007 |
| JP | 2010-170573 A | 8/2010 |
| JP | 2013-521547 A | 6/2013 |
| KR | 20070039613 | 4/2007 |
| KR | 20090101035 A | 9/2009 |
| KR | 20100033242 A | 3/2010 |
| WO | 2006020305 A2 | 2/2006 |
| WO | 2009097592 A1 | 8/2009 |
| WO | WO 2009/099268 A1 | 8/2009 |
| WO | 2009128593 A1 | 10/2009 |
| WO | WO 2010041826 A2 | 4/2010 |
| WO | WO 2010080258 A2 | 7/2010 |

OTHER PUBLICATIONS

Office Action dated Jan. 3, 2014 in connection with U.S. Appl. No. 13/232,595, 18 pages.

(56) References Cited

OTHER PUBLICATIONS

Office Action dated Mar. 26, 2014 in connection with U.S. Appl. No. 13/232,812, 18 pages.
Office Action dated May 21, 2014 in connection with U.S. Appl. No. 13/232,595, 21 pages.
Office Action dated Jun. 3, 2014 in connection with U.S. Appl. No. 13/232,493, 19 pages.
Office Action dated Aug. 12, 2014 in connection with U.S. Appl. No. 13/232,812, 33 pages.
Cancel dictionary definition. Retrieved from [http://dictionary.references.com/browse/cancel] on Jul. 14, 2014, 4 pages.
Non-Final Office Action dated Dec. 2, 2014 in connection with U.S. Appl. No. 13/232,493; 20 pages.
Office Action dated Nov. 19, 2014 in connection with U.S. Appl. No. 13/232,595; 21pages.
Notice of Preliminary Rejection dated Jun. 9, 2015 in connection with Japanese Patent Application No. 2011-210134; 9 pages.
Notice of Patent Grant dated Jun. 9, 2015 in connection with Japanese Patent Application No. 2011-217512; 5 pages.
Final Office Action dated May 14, 2015 in connection with U.S. Appl. No. 13/232,595; 16 pages.
Final Office Action dated Jul. 20, 2015 in connection with U.S. Appl. No. 13/232,812; 17 pages.
Yamaki, H.; "Adobe Acrobat 6.0 Technical Manual"; Windows Acrobat 6.0 Portable Document Format; Nov. 10, 2003; 2 pages.
Non-Final Office Action dated Jan. 28, 2015 in connection with U.S. Appl. No. 13/232,812; 16 pages.
Final Office Action dated Mar. 31, 2015 in connection with U.S. Appl. No. 13/232,493; 18 pages.
The First Office Action dated Jul. 27, 2015 in connection with Chinese Patent Application No. 2011-10306721.1; 21 pages.
The First Office Action dated Aug. 6, 2015 in connection with Chinese Patent Application No. 2011-10295196.8; 30 pages.
The First Office Action dated Sep. 2, 2015 in connection with Chinese Patent Application No. 2011-10307804.2; 51 pages.
Details of the First Office Action dated Sep. 15, 2015 in connection with Chinese Patent Application No. 2011-10303438.3; 29 pages.
Notice of Patent Grant dated Oct. 27, 2015 in connection with Japanese Patent Application No. 2011-211935; 5 pages.
Notice of Patent Grant dated Oct. 27, 2015 in connection with Japanese Patent Application No. 2011-210134; 5 pages.
Notice of Preliminary Rejection dated Oct. 27, 2015 in connection with Japanese Patent Application No. 2011-217625; 9 pages.
Non-Final Office Action dated Nov. 12, 2015 in connection with U.S. Appl. No. 13/232,493; 24 pages.
Non-Final Office Action dated Nov. 13, 2015 in connection with U.S. Appl. No. 13/232,595; 16 pages.
Non-Final Office Action dated Feb. 5, 2016 in connection with U.S. Appl. No. 13/232,812; 12 pages.
Extended European Search Report dated Sep. 5, 2016 in connection with European Application No. 11180098.3, 12 pages.
Notice of Patent Grant dated Aug. 9, 2016 in connection with Japanese Application No. 2011-217625, 5 pages.
Extended European Search Report dated Sep. 5, 2016 in connection with European Application No. 11183429.7, 12 pages.
Extended European Search Report dated Sep. 5, 2016 in connection with European Application No. 11180099.1, 11 pages.
Third Office Action dated Oct. 18, 2016 in connection with Chinese Application No. 201110295196.8, 40 pages.
Notice of Preliminary Rejection dated Sep. 23, 2016 in connection with Korean Application No. 10-2010-1036624, 8 pages.
U.S. Office Action dated Jun. 8, 2016 in connection with U.S. Appl. No. 13/232,812 dated Jun. 8, 2016, 16 pages.
Chinese Office Action dated Apr. 19, 2016 in connection with Chinese Application No. 201110295196.8, 38 pages.
Chinese Office Action dated May 20, 2016 in connection with Chinese Application No. 201110303438.3, 15 pages.
Chinese Office Action dated May 16, 2016 in connection wtih Chinese Application No. 201110307804.2, 31 pages.
Fourth Office Action dated Feb. 4, 2017 in connection with Chinese Application No. 201110306721.1, 18 pages.
Decision of Rejection dated Mar. 10, 2017 in connection with Chinese Application No. 201110307804.2, 33 pages.
Extended European Search Report dated Feb. 9, 2017 in connection with European Application No. 11180097.5, 8 pages.
Notice of Patent Grant dated Mar. 29, 2017 in connection with Korean Application No. 10-2010-0136624, 3 pages.
State Intellectual Property Office of The P.R.C., "Third Office Action," Application No. 201110307804.2, dated Nov. 7, 2016, 33 pages, publisher SIPO, Beijing Shi, China.
Korean Intellectual Patent Office, "Notice of Preliminary Rejection," Application No. 10-2011-0008606, dated Dec. 17, 2016, publisher KIPO, Daejeon, Republic of Korea.
Notice of Patent Grant for Korean Application No. 10-2011-0008606, dated Jun. 29, 2017 (3 pages).

* cited by examiner

APPARATUS AND METHOD FOR TURNING E-BOOK PAGES IN PORTABLE TERMINAL

CROSS-REFERENCE TO RELATED APPLICATION(S) AND CLAIM OF PRIORITY

The present application is related to and claims priority under 35 U.S.C. § 119(a) to Korean Patent Applications filed in the Korean Intellectual Property Office on Oct. 1, 2010 and assigned Serial No. 10-2010-0095815, and on Dec. 28, 2010 and assigned Serial No. 10-2010-0136624, the contents of which are herein incorporated by reference.

TECHNICAL FIELD OF THE INVENTION

The present invention relates to a portable terminal. More particularly, the present invention relates to an apparatus and method for turning electronic book (e-book) pages in a portable terminal having an e-book function.

BACKGROUND OF THE INVENTION

Portable terminals have quickly become popular owing to the convenience of carrying. Accordingly, service providers (e.g., system manufacturers) are competitively developing terminals having more special functions to accommodate many users. For example, the portable terminals are providing various functions of phone books, games, schedulers, short messages, the Internet, electronic mail (e-mail) messages, morning wakeup calls, MPEG-1 Audio Layer 3 (MP3) players, digital cameras, electronic dictionaries, e-books, and such.

Recently, an e-book, one of the information provision media replacing a conventional paper book, is being introduced to show text contents in an electronic display manner. The e-book is of a scheme in which, after storing text contents in a flash memory or a built-in hard disk, the stored text contents are shown through a display screen. The e-book has an advantage of being capable of, after storing a large amount of book stories at a time, selecting and showing desired portions of text.

At this time, the display screen can display only contents of a restricted region. Accordingly, to continuously and seamlessly show the next story of the contents, a User Interface (UI) providing a page move or scroll function should be provided. Generally, the e-book can show a story of text contents on a screen while moving through a page up/page down function using a key input means provided in the e-book. Through this method, a user can read the full story of the text contents stored in the e-book.

However, a UI of a scheme of turning pages through key manipulation as above is merely of a direction control scheme of the most basic form and is not designed from an ergonomic viewpoint of making it convenient for a user to use. So, there is a problem that it is inconvenient for the user to convert pages of contents naturally.

SUMMARY OF THE INVENTION

To address the above-discussed deficiencies of the prior art, it is a primary object to provide at least the advantages below. Accordingly, one aspect of the present invention is to provide an apparatus and method for turning electronic book (e-book) pages in a portable terminal having an e-book function.

Another aspect of the present invention is to provide an apparatus and method for turning e-book pages in an analog manner and enabling a user to turn the pages of contents intuitively with a feeling as if he/she really turns a book in a portable terminal having an e-book function.

The above aspects are achieved by providing an apparatus and method for turning e-book pages in a portable terminal.

According to one aspect of the present invention, a method for turning e-book pages in a portable terminal having an e-book function is provided. The method includes executing an e-book and determining whether a just preceding page gesture is input, the just preceding page gesture comprising a contact that starts to the left of a right-side user interface (UI) activation region of the e-book, followed by a drag toward the right while maintaining the first contact and releasing the first contact. When the just preceding page gesture is input, the just preceding page is displayed on a screen.

According to another aspect of the present invention, an apparatus for turning e-book pages in a portable terminal having an e-book function is provided. The apparatus includes an e-book viewer and a display unit. The e-book viewer executes an e-book, determines whether a just preceding page gesture is input, the just preceding page gesture comprising a first contact that starts to the left of a right-side user interface (UI) activation region of the e-book, followed by a drag toward the right while maintaining the first contact and releasing the first contact, and when the just preceding page gesture is input, controls a display unit to display the just preceding page on a screen. The display unit displays, on the screen, a corresponding page of the e-book according to the control of the e-book viewer.

According to another aspect of the present invention, a method for turning e-book pages in a portable terminal having an e-book function is provided. An e-book is executed. A shortcut item list is displayed in an upper UI activation region of the e-book. Whether a shortcut gesture is input is determined, the shortcut gesture comprising a touch for one shortcut item among the shortcut item list followed by a horizontal drag and a release of the touch. When the shortcut gesture is input, a page corresponding to the one shortcut item is displayed on a screen.

According to yet another aspect of the present invention, an apparatus for turning e-book pages in a portable terminal having an e-book function is provided. The apparatus includes an e-book viewer and a display unit. The e-book viewer executes an e-book, controls a display unit to display a shortcut item list in an upper user interface (UI) activation region of the e-book, and when a shortcut gesture comprising a touch for one shortcut item among the shortcut item list followed by a horizontal drag and a release of the touch is input, controls the display unit to display, on a screen, a page corresponding to the one shortcut item. The display unit displays the shortcut item list in the upper UI activation region according to the control of the e-book viewer, and displays, on the screen, the corresponding page of the e-book.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged a portable terminal having an e-book function. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined based on the disclosure throughout this specification.

Embodiments of the present invention provide a way of turning electronic book (e-book) pages in an analog manner in a portable terminal having an e-book function.

In the following description, portable terminals include any cellular phone with a touch panel, a Personal Communication System (PCS), a Personal Data Assistant (PDA), an International Mobile Telecommunication-2000 (IMT-2000) terminal, and such. The following description is made using general constructions of the examples.

Figure 1:
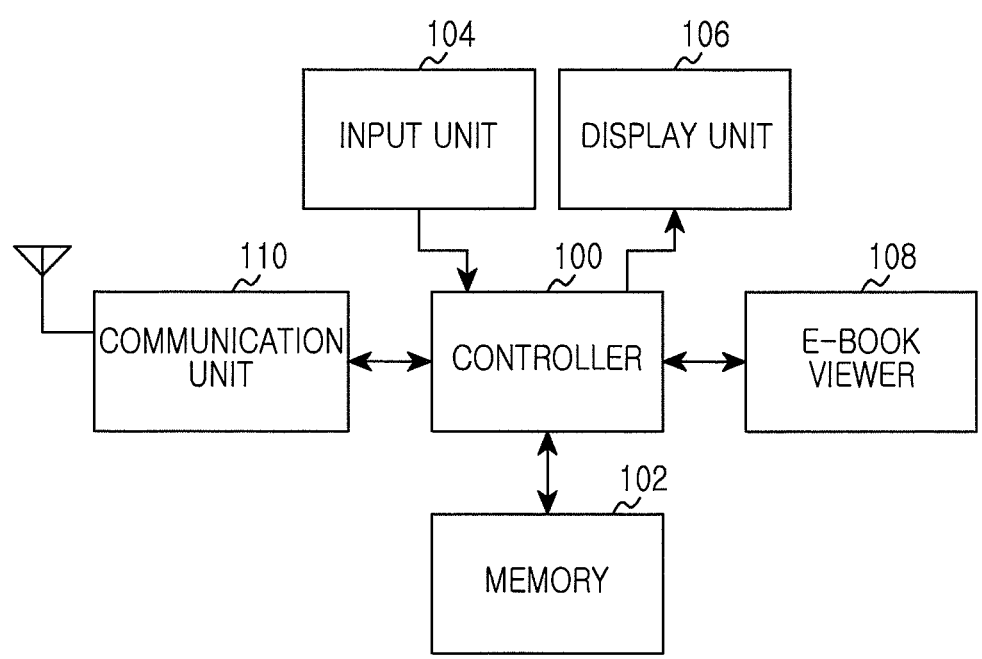
FIG. 1 is a block diagram of a portable terminal having an electronic book (e-book) function according an embodiment of the present invention.

FIG. 1 is a block diagram of a portable terminal having an e-book function according an embodiment of the present invention.

As illustrated in FIG. 1, the portable terminal may include a controller 100, a memory 102, an input unit 104, a display unit 106, an e-book viewer 108, and a communication unit 110.

Referring to FIG. 1, the controller 100 controls a general operation of the portable terminal and processes a function of turning e-book pages in an analog manner according to the present invention.

The memory 102 stores microcode of a program for processing and controlling the controller 100 and a variety of reference data, temporary data generated during execution of a variety of programs, and a diversity of updateable data. Particularly, the memory 102 stores a program for turning e-book pages in an analog manner according to the present invention.

The input unit 104 may include numeral key buttons and function key buttons. The input unit 104 provides key button input data corresponding to a key button pressed by a user to the controller 100.

The display unit 106 may display state information generated during operation of the portable terminal, characters, moving pictures, still pictures, and so forth. In addition to common functions, according to the present invention, the display unit 106 may be implemented in a form of a touch panel and perform a function of the input unit 104. That is, the display unit 106 may sense a user's touch input and transmit the sensed touch input to the controller 100.

The e-book viewer 108 performs a function of turning pages of an e-book by one or several pages at a time in an analog manner such that a user can turn pages of contents intuitively with a feeling as if he/she really turns the pages in a book. Furthermore, the e-book viewer 108 supports a bookmark function for the e-book. In some embodiments, the functions of the e-book viewer 108 may be incorporated into and performed by the controller 100.

The communication unit 110, which is optional, performs a function of transmitting/receiving and processing a wireless signal input/output through an antenna. For example, during a transmission mode, the communication unit 110 performs a function of processing original data through channel coding and spreading, converting the original data into a Radio Frequency (RF) signal, and transmitting the RF During a reception mode, the communication unit 110 performs a function of processing a received RF signal through de-spreading and channel decoding, and restoring the signal to original data.

Figures 2A, 2B:
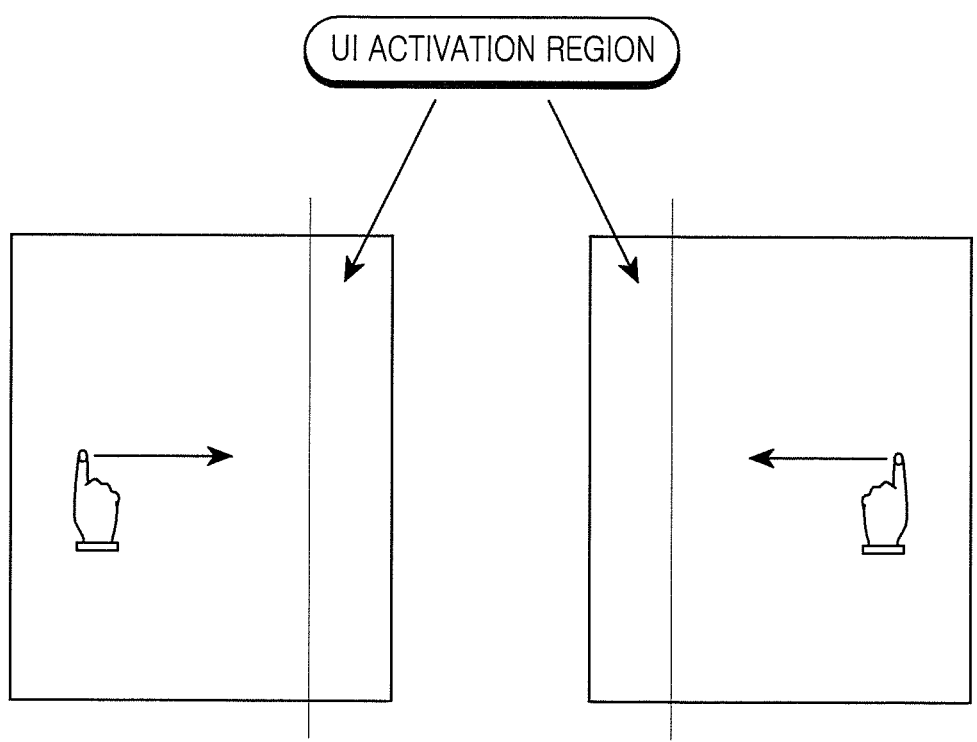
FIGS. 2A and 2B are example diagrams of a process for turning an e-book by one page in an analog manner in a portable terminal having an e-book function according to a first embodiment of the present invention.

FIGS. 2A and 2B are example diagrams of a process for turning an e-book by one page in an analog manner in a portable terminal having an e-book function according to a first embodiment of the present invention.

Referring to FIGS. 2A and 2B, the terminal executes the e-book function and displays, on a screen (e.g. touch screen), a preset page of an e-book selected by a user. Here, a right partial region of the screen is defined as a right UI activation region, and a left partial region of the screen is defined as a left UI activation region. Here, the right UI activation region and the left UI activation region are preset suitable to a corresponding terminal.

As shown in FIG. 2A, if a just preceding page gesture is input, the terminal displays the just preceding page on the screen. The just preceding page gesture may be defined as a touch down (i.e. making contact with the touch screen) to the left of the predetermined right-side UI activation region of the e-book and then, while the touch down is input, a drag toward the right side followed by a touch up (i.e. releasing contact from the touch screen). As shown in FIG. 2B, if a just next page gesture is input, the terminal displays the just next page on the screen. The just next page gesture may be defined as a touch down to the right of the predetermined left-side UI activation region of the e-book and then, while the touch down is input, a drag toward the left followed by a touch up.

Figure 3:
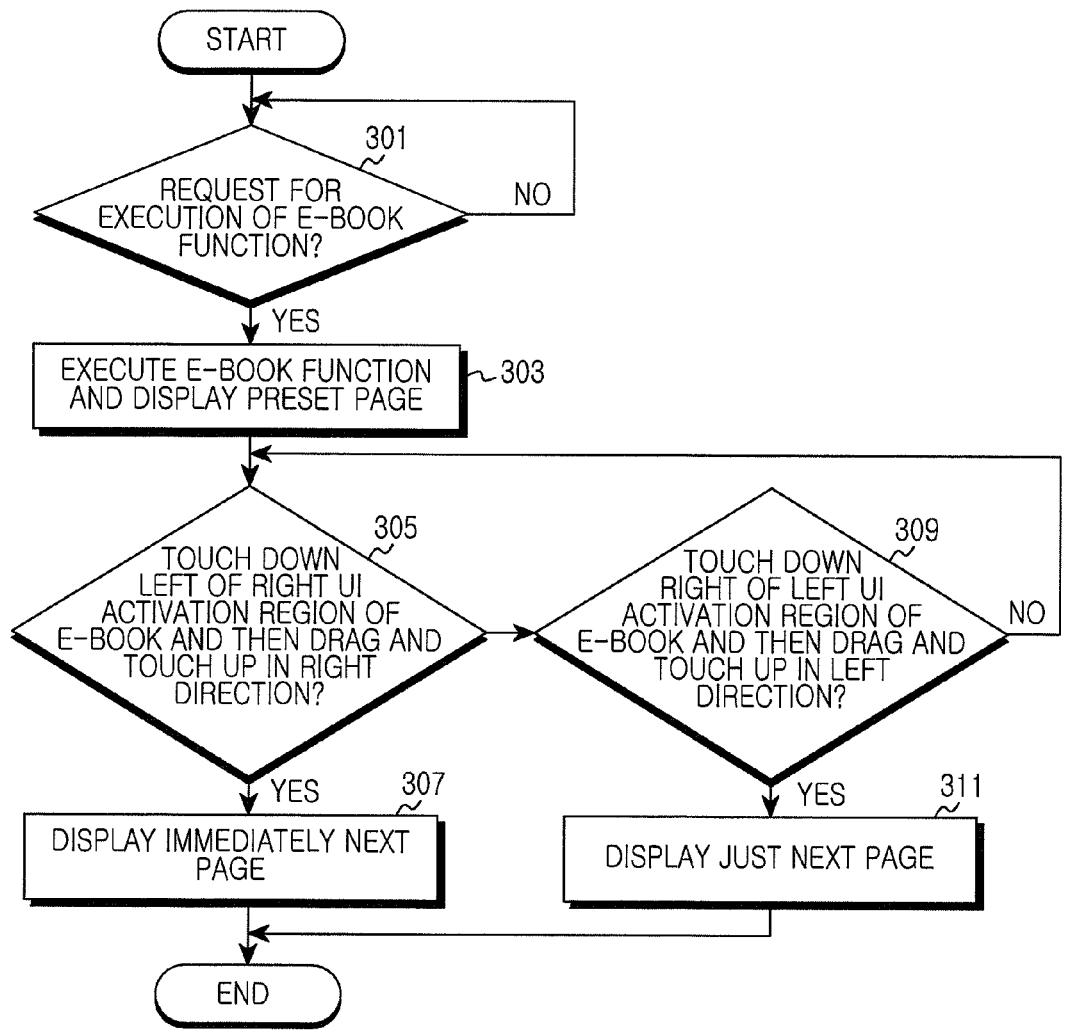
FIG. 3 illustrates a process for turning an e-book by one page in an analog manner in a portable terminal having an e-book function according to the first embodiment of the present invention.

FIG. 3 illustrates a process for turning an e-book by one page in an analog manner in a portable terminal having an e-book function according to the first embodiment of the present invention.

Referring to FIG. 3, in step 301, the terminal determines whether a request for execution of an e-book function is sensed according to user's key manipulation.

When it is determined in step 301 that the request for execution of the e-book function is sensed, in step 303, the terminal executes the e-book function and, according to setting information of the e-book function, displays a preset page of an e-book selected by a user. For example, the setting information of the e-book function can be preset to display the first page of a corresponding e-book or display the previously last displayed page of the corresponding e-book at the time of execution of the e-book function.

In step 305, the terminal determines whether a just preceding page gesture is input. As described above, the just preceding page gesture may be defined as a touch down (i.e. contact with the touch screen) to the left of a predetermined right-side UI activation region of the e-book followed by a drag while the touch down is input and a touch up (i.e. release contact from the touch screen).

When it is determined in step 305 that the that the just preceding page gesture is input, the terminal displays the just preceding page on the screen in step 307.

In contrast, when it is not determined in step 305 that the just preceding page gesture is input, the terminal determines whether a just next page gesture is input in step 309. As described above, the just next page gesture may be defined as a touch down to the right of a predetermined left-side UI activation region of the e-book, followed by a drag to the left while maintaining contact and a touch up.

When it is determined in step 309 that the just next page gesture is input, the terminal displays the just next page on the screen in step 311.

In contrast, when it is not determined in step 309 that the just next page gesture is input, the terminal returns to step 305.

After that, the terminal terminates the process according to the embodiment of the present invention.

Figure 4A:
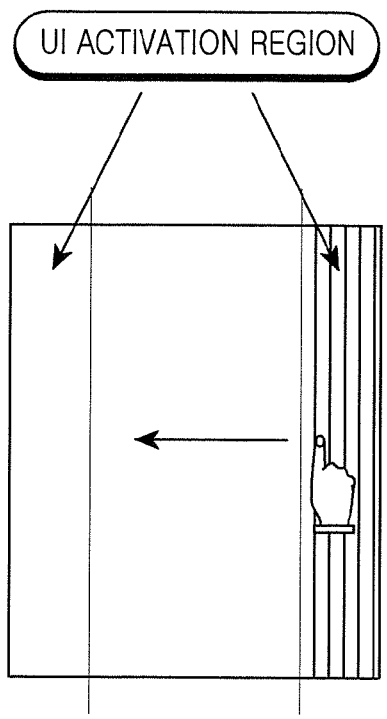
FIGS. 4A and 4B are example diagrams of a process for turning an e-book by several pages in an analog manner in a portable terminal having an e-book function according to a second embodiment of the present invention.
Figure 4B:
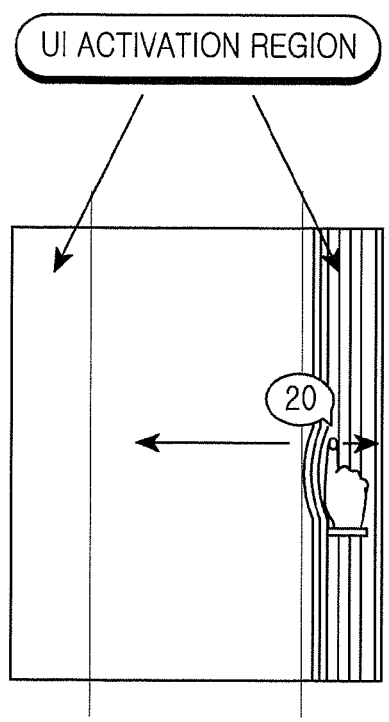

FIGS. 4A and 4B are example diagrams of a process for turning several pages at a time in an analog manner in an e-book function of a portable terminal according to a second embodiment of the present invention.

Referring to FIGS. 4A and 4B, the terminal executes the e-book function, and displays, on a screen, a preset page of an e-book selected by a user. Here, a right partial region of the screen is defined as a right UI activation region, and a left partial region of the screen is defined as a left UI activation region. Here, the right UI activation region and the left UI activation region are preset suitable to a corresponding terminal.

If a touch down is input in the predetermined right UI activation region of the e-book, the terminal displays the right side of the e-book. At this time, as shown in FIG. 4A, if a drag and touch up is input in the left direction while the touch down is input in the predetermined right UI activation region, the terminal displays the just next page on the screen. In contrast, as shown in FIG. 4B, if a drag is input in the right direction while the touch down is input in the predetermined right UI activation region, the terminal indicates the of page number of a page to be turned according to the amount of the dragging toward the right side of the e-book and, if a drag and touch up is input in the left direction while the drag is input in the right direction, the terminal displays a subsequent page corresponding to the page number of the turned page.

Although not illustrated, if a touch down is input in the predetermined left UI activation region of the e-book, the terminal analogously displays the left side of the e-book. At this time, if a drag and touch up is input in the right direction while the touch down is input in the predetermined left UI activation region, the terminal displays the just preceding page on the screen. In contrast, if a drag is input in the left direction while the touch down is input in the predetermined left UI activation region, the terminal indicates the page number of a page to be turned according to the amount of the dragging toward the left side of the e-book and, if a drag and touch up is input in the right direction while the drag is input in the left direction, the terminal displays a preceding page corresponding to the page number of the turned page.

Figure 5A:
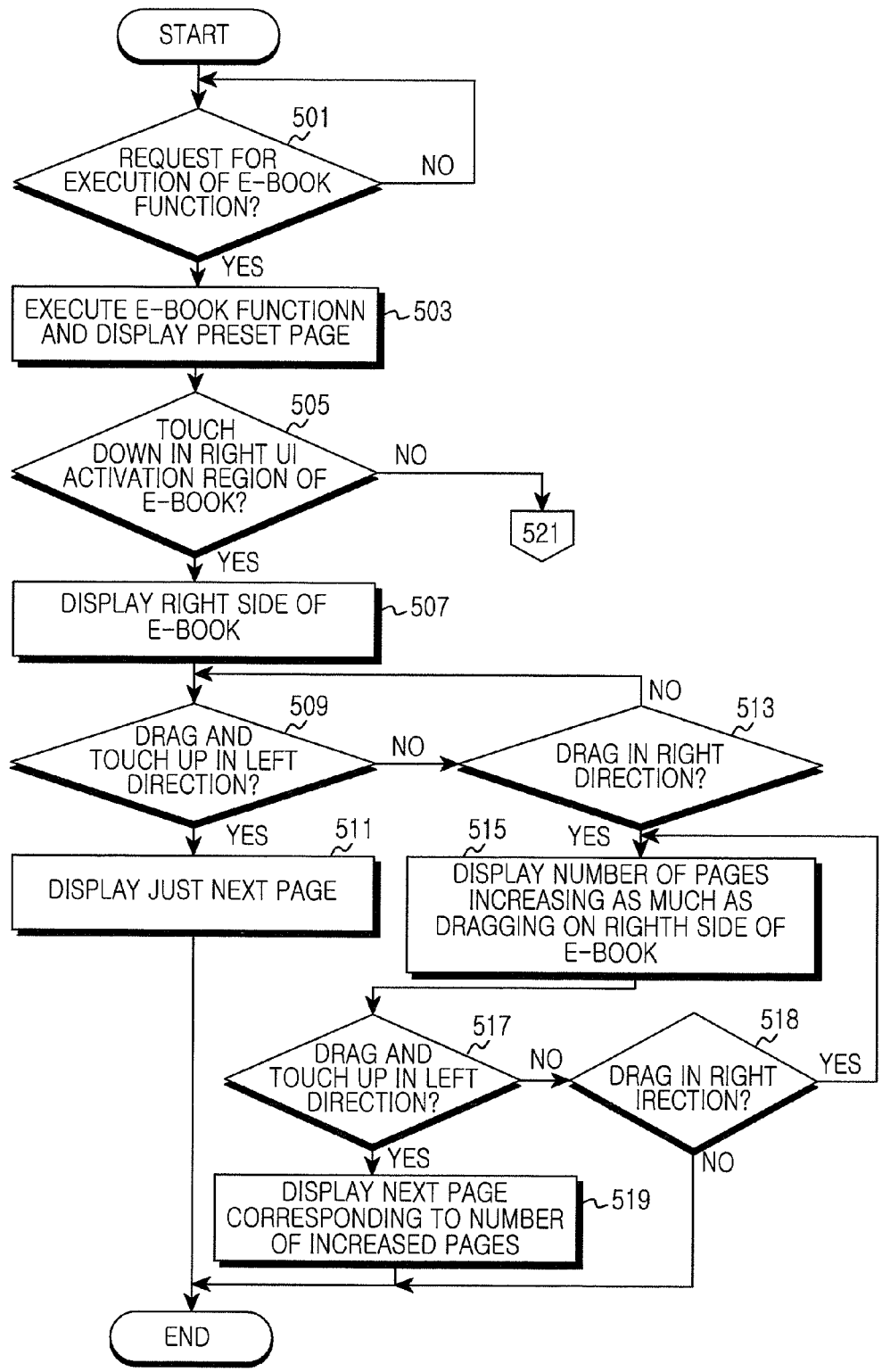
FIGS. 5A and 5B illustrate a process for turning an e-book by several pages in an analog manner in a portable terminal having an e-book function according to the second embodiment of the present invention.
Figure 5B:
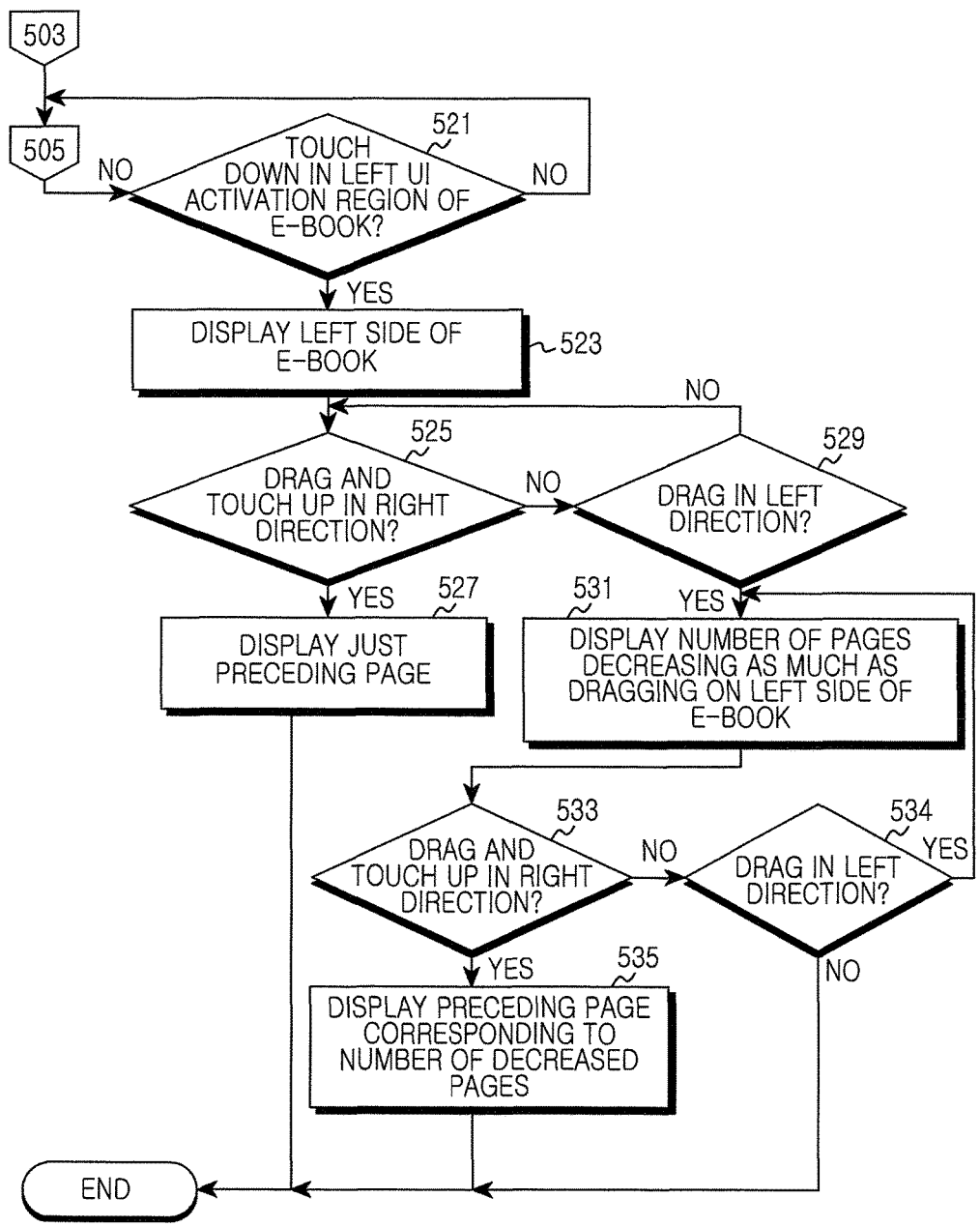

FIGS. 5A and 5B illustrate a process for turning several pages at a time in an analog manner in an e-book function of a portable terminal according to the second embodiment of the present invention.

Referring to FIGS. 5A and 5B, in step 501, the terminal determines whether a request for execution of an e-book function is sensed according to a user's key manipulation.

When it is determined in step 501 that the request for execution of the e-book function is sensed, in step 503, the terminal executes the e-book function and, according to setting information of the e-book function, displays a preset page of an e-book selected by a user. For example, the setting information of the e-book function can be preset to display the first page of a corresponding e-book or display the previously last displayed page of the corresponding e-book at the time of execution of the e-book function.

In step 505, the terminal determines whether a touch down is input in a predetermined right UI activation region of the e-book.

When it is determined in step 505 that the touch down is input in the predetermined right UI activation region of the e-book, the terminal displays the right side of the e-book in step 507 and proceeds to step 509.

In step 509, the terminal determines whether a drag and touch up is input in the left direction while the touch down is input in the predetermined right UI activation region.

When it is determined in step 509 that the drag and touch up is input in the left direction while the touch down is input in the predetermined right UI activation region, the terminal displays the just next page on the screen in step 511.

In contrast, when it is not determined in step 509 that the drag and touch up is input in the left direction while the touch down is input in the predetermined right UI activation region, the terminal determines whether a drag is input in the right direction while the touch down is input in the predetermined right UI activation region.

When it is determined in step 513 that the drag is input in the right direction while the touch down is input in the predetermined right UI activation region, the terminal indicates the page number of a page to be turned according to the dragging toward the right side of the e-book and then in step 515 and proceeds to step 517. According to an embodiment, the page number of page to be turned increases more quickly according to the dragging.

In step 517, the terminal determines whether a drag and touch up is input in the left direction while the drag is input in the right direction.

When it is determined in step 517 that the drag and touch up is input in the left direction while the drag is input in the right direction, the terminal displays a subsequent page corresponding to the number of turned pages.

When it is determined in step 517 that the drag and touch up in the left direction while the drag is input in the right direction, in step 518, the terminal determines whether a drag is continuously input in the right direction, while the drag is input in the right direction.

When it is determined in step 518 that the drag is continuously input in the right direction while the drag is input in the right direction, the terminal returns to step 515.

In contrast, when it is determined in step 518 that the drag is not continuously input in the right direction while the drag is input in the right direction, the terminal terminates the process according to the embodiment of the present invention. For example, while the drag is input in the right direction, when a touch up is input without a drag of the left direction or right direction, the terminal terminates the process according to the embodiment of the present invention.

When it is determined in step 513 that the drag is not input in the right direction in the state where the touch down is input in the predetermined right UI activation region, the terminal returns to step 509.

When it is determined in step 505 that the touch down is not input in the predetermined right UI activation region of the e-book, the terminal determines whether a touch down is input in a predetermined left UI activation region of the e-book in step 521.

When it is determined in step 521 that the touch down is input in the predetermined left UI activation region of the e-book, the terminal displays the left side of the e-book in step 523 and proceeds to step 525.

In step 525, the terminal determines whether a drag and touch up is input in the right direction while the touch down is input in the predetermined left UI activation region.

When it is determined in step 525 that the drag and touch up is input in the right direction while the touch down is input in the predetermined left UI activation region, the terminal displays the just preceding page on the screen in step 527.

In contrast, when it is determined in step 525 that the drag and touch up is not input in the right direction while the touch down is input in the predetermined left UI activation region, in step 529, the terminal determines whether a drag is input in the left direction while the touch down is input in the predetermined left UI activation region.

When it is determined in step 529 that the drag is input in the left direction while the touch down is input in the predetermined left UI activation region, in step 531, the terminal indicates the page number of a page to be turned according to the dragging toward the left side of the e-book and then, proceeds to step 533. Here, the page number of page indicated on the left side increases more quickly according to the dragging.

Next, in step 533, the terminal determines whether a drag and touch up is input in the right direction while the drag is input in the left direction.

When it is determined in step 533 that the drag and touch up is input in the right direction while the drag is input in the left direction, the terminal displays a preceding page according to the number of turned pages.

In contrast, when it is determined in step 533 that the drag and touch up is not input in the right direction while the drag is input in the left direction, in step 534, the terminal determines whether a drag is continuously input in the left direction while the drag is input in the left direction.

When it is determined in step 534 that the drag is continuously input in the left direction while the drag is input in the left direction, the terminal returns to step 531.

In contrast, when it is determined in step 534 that the drag is not continuously input in the left direction, the terminal terminates the process according to the embodiment of the present invention. For instance, while the drag is input in the left direction, when a touch up is input without a drag of the left direction or right direction, the terminal terminates the process according to the embodiment of the present invention.

When it is determined in step 529 that the drag is not input in the left direction while the touch down is input in the predetermined left UI activation region, the terminal returns to step 525.

When it is determined in step 521 that the touch down is not input in the predetermined left UI activation region of the e-book, the terminal returns to step 505.

After that, the terminal terminates the process according to the embodiment of the present invention.

According to an embodiment, an e-book function can be executed in various modes according to a user's key manipulation. For example, the e-book function can be executed in a bookmark mode supporting a bookmark, a concavo-convex mode supporting a shortcut function, and such. Hereinafter, the execution of the e-book function of the bookmark mode supporting the bookmark and the execution of the e-book function of the concavo-convex mode supporting the shortcut will be described.

Figures 6A, 6B:
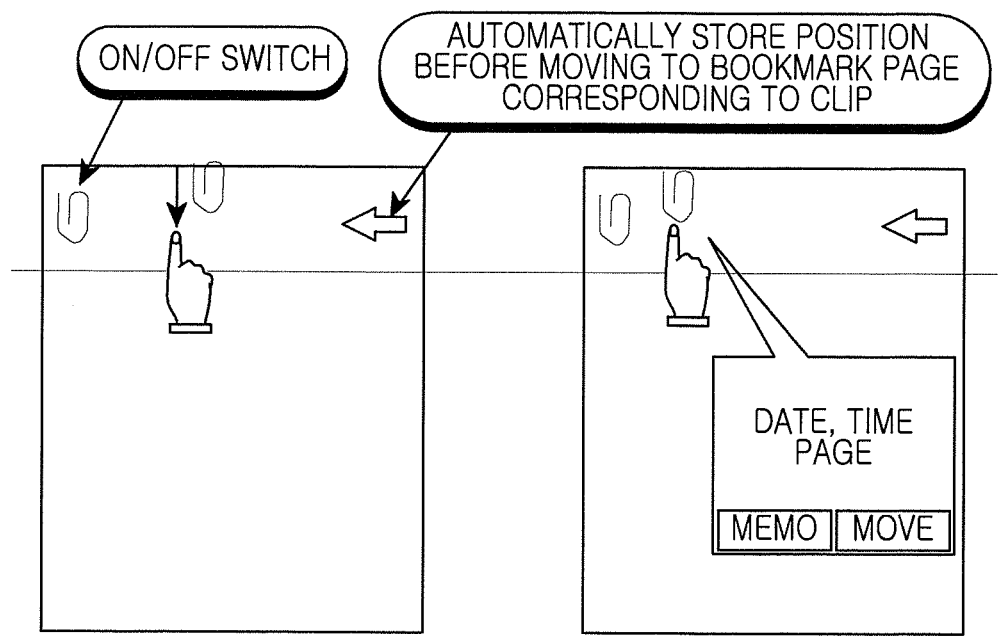
FIGS. 6A and 6B are example diagrams of a process for supporting a bookmark for an e-book in a portable terminal having an e-book function according to a third embodiment of the present invention.

FIGS. 6A and 6B are example diagrams of a process for supporting a bookmark for an e-book in a portable terminal having an e-book function according to a third embodiment of the present invention.

Referring to FIGS. 6A and 6B, the terminal executes the e-book function and displays, on a screen, a preset page of an e-book selected by a user. The terminal toggles a bookmark On/Off switch to activate/deactivate a bookmark function. At this time, an upper partial region of the screen is defined as an upper UI activation region, and the upper UI activation region is preset suitable to a corresponding terminal. The bookmark On/Off switch for activation/deactivation of the bookmark function can be positioned on the left side in the predetermined upper UI activation region of the e-book. For example, the bookmark On/Off switch can be displayed in a clip shape. Furthermore, a menu for automatically storing a position before moving to a bookmark page corresponding to a clip can be positioned on the right side in the predetermined upper UI activation region of the e-book. For example, the menu can be displayed in an arrow shape.

As shown in FIG. 6A, if a touch down is input in the predetermined upper UI activation region of the e-book and then, while the touch down is input, a drag is input in a downward direction, the terminal determines that there is a request for a bookmark and generates a clip corresponding to a bookmark to be added. Here, a position of the clip can move along a drag direction until a touch up is input while the drag is input in the downward direction. After that, if a touch up is input while the drag is input in the downward direction, the terminal positions the generated clip in a position where the touch up is input. Here, a shape, color, and such, of the generated clip can be set according to preset information. According to an embodiment, the terminal may position the generated clip in a position where the touch up is input and concurrently display an input window through a popup window, receive an input of information of a shape, color, and such, of the generated clip from a user, and change the shape, color, and such, of the generated clip according to the received information.

As shown in FIG. 6B, if a touch down is input for a clip corresponding to a previously added bookmark (e.g. the user taps on the clip for the bookmark), the terminal displays the corresponding bookmark page. If a long touch is sensed for the clip corresponding to the previously added bookmark, whose bookmark page has been displayed, the terminal determines that there is a request for displaying information on the previously added bookmark and displays the information on the previously added bookmark through a popup window. Here, the long touch represents a continuous touch (e.g. for one or two seconds), and the information on the bookmark can include information of a generation date of the bookmark, a generation time, a bookmark page, and such. Furthermore, the popup window can display not only information on a corresponding bookmark but also a memo menu for memo composition and a move menu for position change of the bookmark. In this situation, if the memo menu is selected from a user, the terminal can display a memo window and receive an input of memos to be written about the bookmark. If the move menu is selected by the user, the terminal can perform a bookmark position change mode and receive an input of a changed position of a clip corresponding to the bookmark.

Although not illustrated, if a touch down is input for a clip corresponding to a previously added bookmark, the terminal displays a corresponding bookmark page. If a drag and touch up is input in the left/right direction while the touch down is input for the clip corresponding to the previously added bookmark, whose bookmark page has been displayed, the terminal determines that there is a request for movement to the bookmark page corresponding to the previously added bookmark, and moves to the bookmark page.

Although not illustrated, if a touch down is input for a clip corresponding to a previously added bookmark, and then a drag and touch up is input in the upward direction while the touch down is input, the terminal determines that there is a request for removal of the previously added bookmark and deletes a clip corresponding to the previously added bookmark.

Figure 7A:
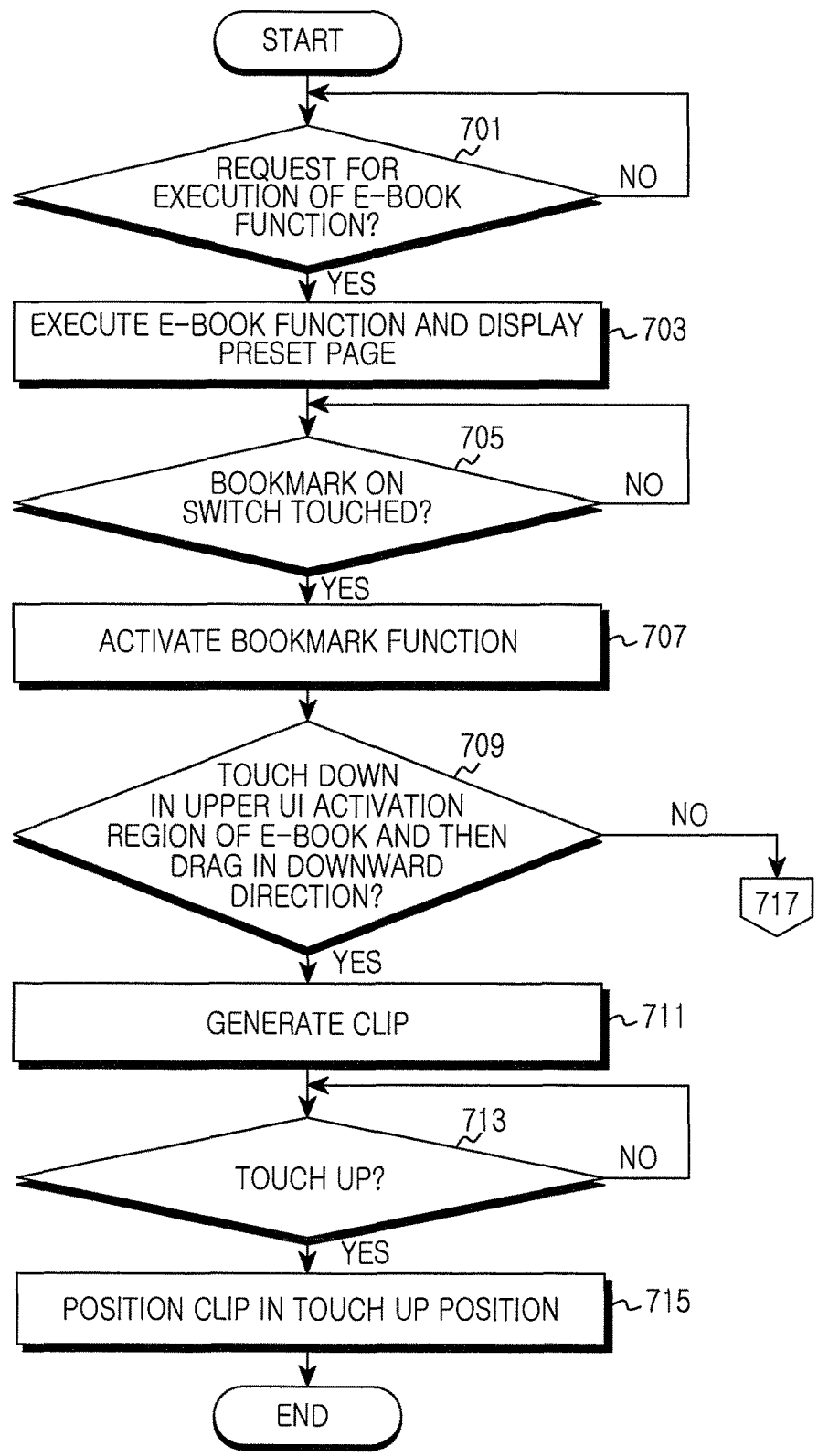
FIGS. 7A and 7B illustrate a process for supporting a bookmark for an e-book in a portable terminal having an e-book function according to the third embodiment of the present invention.
Figure 7B:
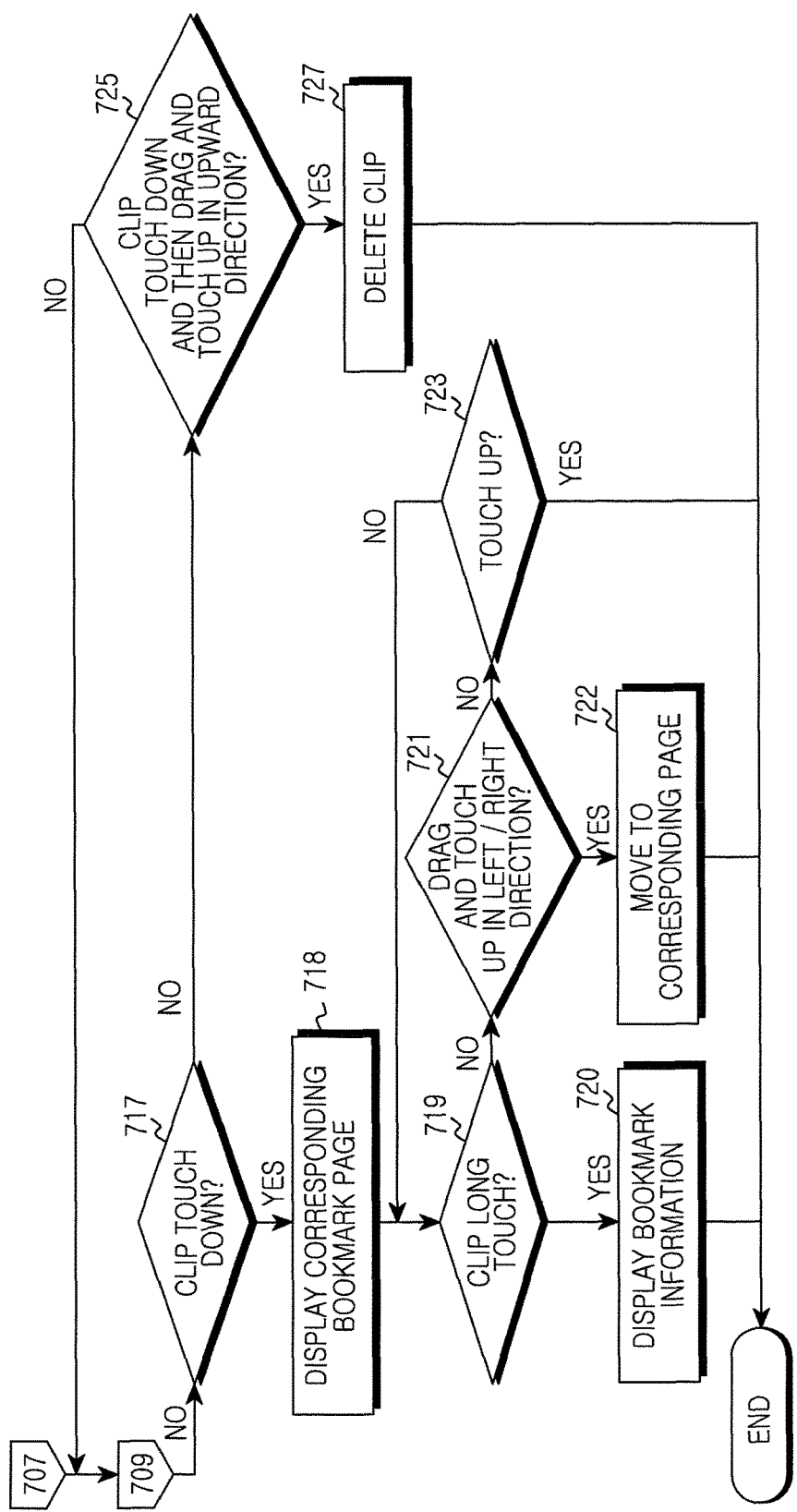

FIGS. 7A and 7B illustrate a process for supporting a bookmark for an e-book in a portable terminal having an e-book function according to the third embodiment of the present invention.

Referring to FIGS. 7A and 7B, in step 701, the terminal determines whether a request for execution of an e-book function is sensed according to user's key manipulation.

When it is determined in step 701 that the request for execution of the e-book function is sensed, in step 703, the terminal executes the e-book function and, according to setting information of the e-book function, displays a preset page of an e-book selected by a user. For example, the setting information of the e-book function can be preset to display the first page of a corresponding e-book or display the previously last displayed page of the corresponding e-book at the time of execution of the e-book function.

Next, in step 705, the terminal determines whether a bookmark On switch is touched (e.g., touch up after touch down). According to an embodiment, the bookmark On switch may be, for example, positioned on the left side in a predetermined upper UI activation region of the e-book, and can be displayed in a clip shape. According to an embodiment of the present invention, the bookmark On switch may be realized as one toggle switch for performing turning the bookmark switch On or 'Off'. In this situation, when the switch is touched in a bookmark 'Off' state, the switch can transition to a bookmark On state to activate a bookmark function. When the switch is touched in the bookmark On state, the switch can transition to the bookmark 'Off' state to deactivate the bookmark function.

When it is determined in step 705 that the bookmark On switch is touched, in step 707, the terminal activates the bookmark function and proceeds to step 709.

In step 709, the terminal determines whether a touch down is input in the predetermined upper UI activation region of the e-book and then, while the touch down is input, a drag is input in the downward direction.

When it is determined in step 709 that the touch down is input in the predetermined upper UI activation region of the e-book, followed by a downward drag while the touch down is input, the terminal determines that there is a request for addition of a bookmark and, in step 711, generates a clip corresponding to a bookmark to be added, and proceeds to step 713. Here, a position of the clip can move along a drag direction until a touch up is input while the drag is input in the downward direction.

Next, in step 713, the terminal determines whether a touch up is input while the drag is input in the downward direction.

When it is determined in step 713 that the touch up is input while the drag is input in the downward direction, in step 715, the terminal positions the generated clip where the touch up is input, and terminates the process according to the embodiment of the present invention. Here, a shape, color, and such, of the generated clip can be set according, to preset information. According to an embodiment, the terminal may position the generated clip in the position where the touch up is input and simultaneously display an input window through a popup window, receive an input regarding information of the shape, color, and such, of the generated clip from a user, and change the shape, color, and such, of the generated clip according to the received information.

In contrast, when it is determined in step 709 that the touch down is input in the predetermined upper UI activation region of the e-book, followed by a downward drag while the touch down is input, in step 717, the terminal determines whether a touch down is input for a clip corresponding to a previously added bookmark.

When it is determined in step 717 that the touch down is input for the clip corresponding to the previously added bookmark, in step 718, the terminal displays a corresponding bookmark page, and proceeds to step 719.

In step 719, the terminal determines whether a long touch is sensed for the clip corresponding to the previously added bookmark, whose bookmark page has been displayed. Here, the long touch represents a continuous touch for one or two seconds, for example.

When it is determined in step 719 that the long touch is sensed for the clip corresponding to the previously added bookmark, whose bookmark page has been displayed, the terminal determines that there is a request for displaying information on the previously added bookmark, whose bookmark page has been displayed and, in step 720, displays the information regarding the previously added bookmark through a popup window, and terminates the process according to the embodiment of the present invention. Here, the information regarding the bookmark may include information of a generation date of the bookmark, a generation time, a bookmark page, and such. Furthermore, the popup window may display not only information on a corresponding bookmark but also a memo menu for memo composition and a move menu for position change of a corresponding bookmark. In this situation, if the memo menu is selected from a user, the terminal can display a memo window and receive an input of memos to be written about the bookmark. If the move menu is selected from the user, the terminal can perform a bookmark position change mode and receive an input of a changed position of a clip corresponding to the bookmark.

In contrast, when it is determined in step 719 that the long touch is not sensed for the clip corresponding to the previously added bookmark, whose bookmark page has been displayed, in step 721, the terminal determines whether a drag and touch up is input in the left/right direction while the touch down is input for the clip corresponding to the previously added bookmark.

When it is determined in step 721 that the drag and touch up is input in the left/right direction while the touch down is input for the clip corresponding to the previously added bookmark, the terminal determines that there is a request for movement to the bookmark page corresponding to the previously added bookmark, which has been displayed and, in step 722, moves to the bookmark page and terminates the process according to the embodiment of the present invention.

In contrast, when it is determined in step 721 that the drag and touch up is not input in the left/right direction while the touch down is input for the clip corresponding to the previously added bookmark, in step 723, the terminal determines whether a touch up is input in the state where the touch down is input for the clip corresponding to the previously added bookmark.

When it is determined in step 723 that the touch up is input while the touch down is input for the clip corresponding to the previously added bookmark, the terminal terminates the process according to the embodiment of the present invention.

In contrast, when it is determined in step 723 that the touch up is not input while the touch down is input for the clip corresponding to the previously added bookmark, the terminal returns to step 719.

In contrast, when it is determined in step 717 that the touch down is not input for the clip corresponding to the previously added bookmark, in step 725, the terminal determines whether a touch down for a clip corresponding to a previously added bookmark, followed by a drag and touch up in the upward direction (e.g., till the end of the upward direction), is input.

When it is determined in step 725 that the touch down is input for the clip corresponding to the previously added bookmark, followed by the drag and touch up in the upward direction, the terminal determines that there is a request for removal of the previously added bookmark and, in step 727, the terminal deletes the clip corresponding to the previously added bookmark and terminates the process according to the embodiment of the present invention.

In contrast, when it is determined in step 725 that the touch down is input for the clip corresponding to the previously added bookmark and then, while the touch down is input, the drag and touch up in the upward direction is not input, the terminal returns to step 709.

Next, the terminal terminates the process according to the embodiment of the present invention.

Figures 8A, 8B:
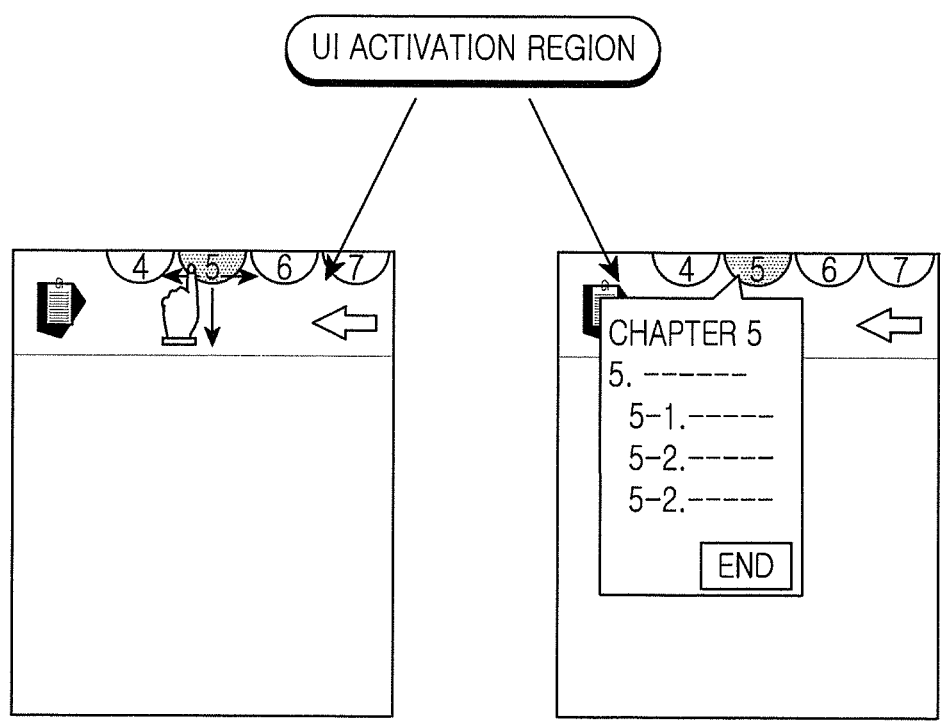
FIGS. 8A and 8B are example diagrams of a process for supporting a shortcut for an e-book in a portable terminal having an e-book function according to a fourth embodiment of the present invention.

FIGS. 8A and 8B are example diagrams of a process for supporting shortcut for an e-book in a portable terminal having an e-book function according to a fourth embodiment of the present invention.

Referring to FIGS. 8A and 8B, the terminal executes the e-book function and displays, on a screen, a preset page of an e-book selected by a user. After that, a shortcut On/Off switch is touched to activate a shortcut function. At this time, an upper partial region of the screen is defined as an upper UI activation region, and the upper UI activation region may be preset for a corresponding terminal. The shortcut On/Off switch for activation/deactivation of the shortcut function can be positioned on the left side in the predetermined upper UI activation region of the e-book. For example, the shortcut On/Off switch can be displayed in a document shape. Furthermore, a menu for automatically storing a position before moving to a page corresponding to a shortcut item can be positioned on the right side in the predetermined upper UI activation region of the e-book. For example, the menu can be displayed in an arrow shape. Here, the shortcut item, which enables quick movement to a corresponding page according to a user's key manipulation, is arranged in a predefined order in the upper UI activation region of the e-book. For example, the shortcut item can be composed of a chapter intended for quick move, a table, a picture, a page, and such.

As shown in FIG. 8A, if a touch down is input for one shortcut item among a shortcut item list displayed in the upper UI activation region of the e-book and then, while the touch down is input, a drag and touch up is input in the left/right direction, the terminal determines whether there is a request for a shortcut to a corresponding page, and displays the page corresponding to the one shortcut item. In contrast, if a touch down is input for one shortcut item among the shortcut item list displayed in the upper UI activation region of the e-book and then, while the touch down is input, a drag and touch up is input in the downward direction, as shown in FIG. 8B, the terminal displays a sub item list of the one shortcut item on a screen through a popup window. For example, when the one shortcut item is Chapter 5, the sub item list can be composed of Chapters 5-1, 5-2, 5-3, and so forth, and in the popup window, the sub item list, a title of each sub item, and such, can be displayed.

Figure 9A:
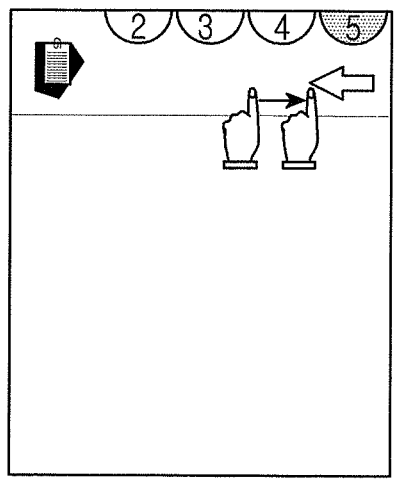
FIGS. 9A and 9B are example diagrams of a process for supporting a shortcut for an e-book in a portable terminal having an e-book function according to an embodiment of the present invention.
Figure 9B:
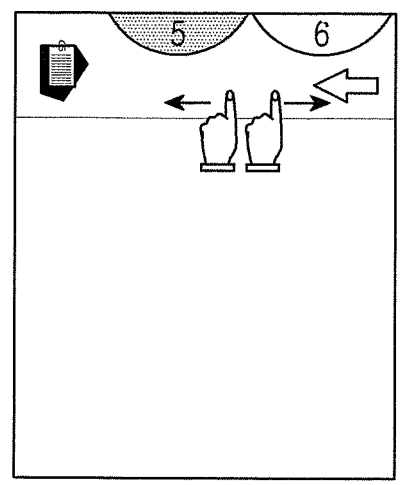

FIGS. 9A and 9B are example diagrams of a process for supporting shortcut for an e-book in a portable terminal having an e-book function according to a fifth embodiment of the present invention.

As shown in FIG. 9A, if a touch down is input in an upper UI activation region of an e-book and then, while the touch down is input, a drag and touch up is input in the left/right direction, the terminal displays scrolls across the next/previous shortcut item list according to the dragging in the upper UI activation region of a screen. For example, when a shortcut item list currently displayed on a screen is Chapters 4, 5, 6, and 7, the terminal can display Chapters 2, 3, 4, and 5 listed in a previous shortcut item list, according to the dragging on the screen.

As shown in FIG. 9B, if a multi touch down (e.g. when multiple fingers come in contact with the touch screen concurrently or one finger comes in contact with the touch screen, for example, twice within a short period of time) is input in an upper UI activation region of an e-book and then, while the multi touch down is input, a drag and touch up is input, the terminal determines whether a distance value between points of the multi touch down is input increases. If it is determined that the distance value increases, the terminal displays a shortcut item list of an enlarged size corresponding to the increased distance value in the upper UI activation region of a screen. If it is determined that the distance value decreases, the terminal displays a shortcut item list of a reduced size corresponding to the decreased distance value in the upper UI activation region of the screen. For example, when the shortcut item list currently displayed on the screen is Chapters 4, 5, 6, and 7, among them, Chapters 5 and 6 can be displayed in the enlarged size on the screen.

Figure 10A:
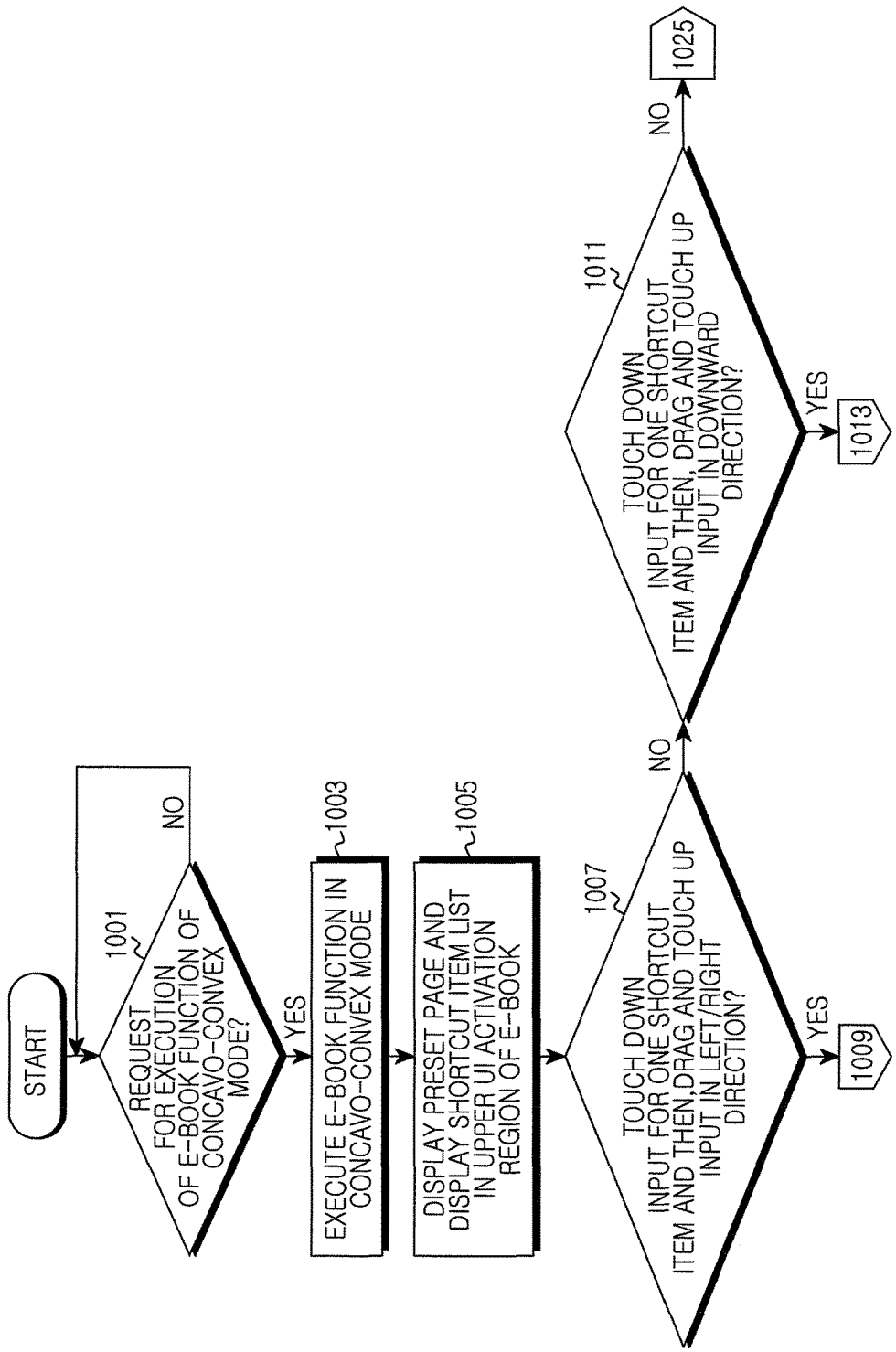
FIGS. 10A-10C illustrate a process for supporting shortcut for an e-book in a portable terminal having an e-book function according to the fourth embodiment of the present invention.
Figure 10B:
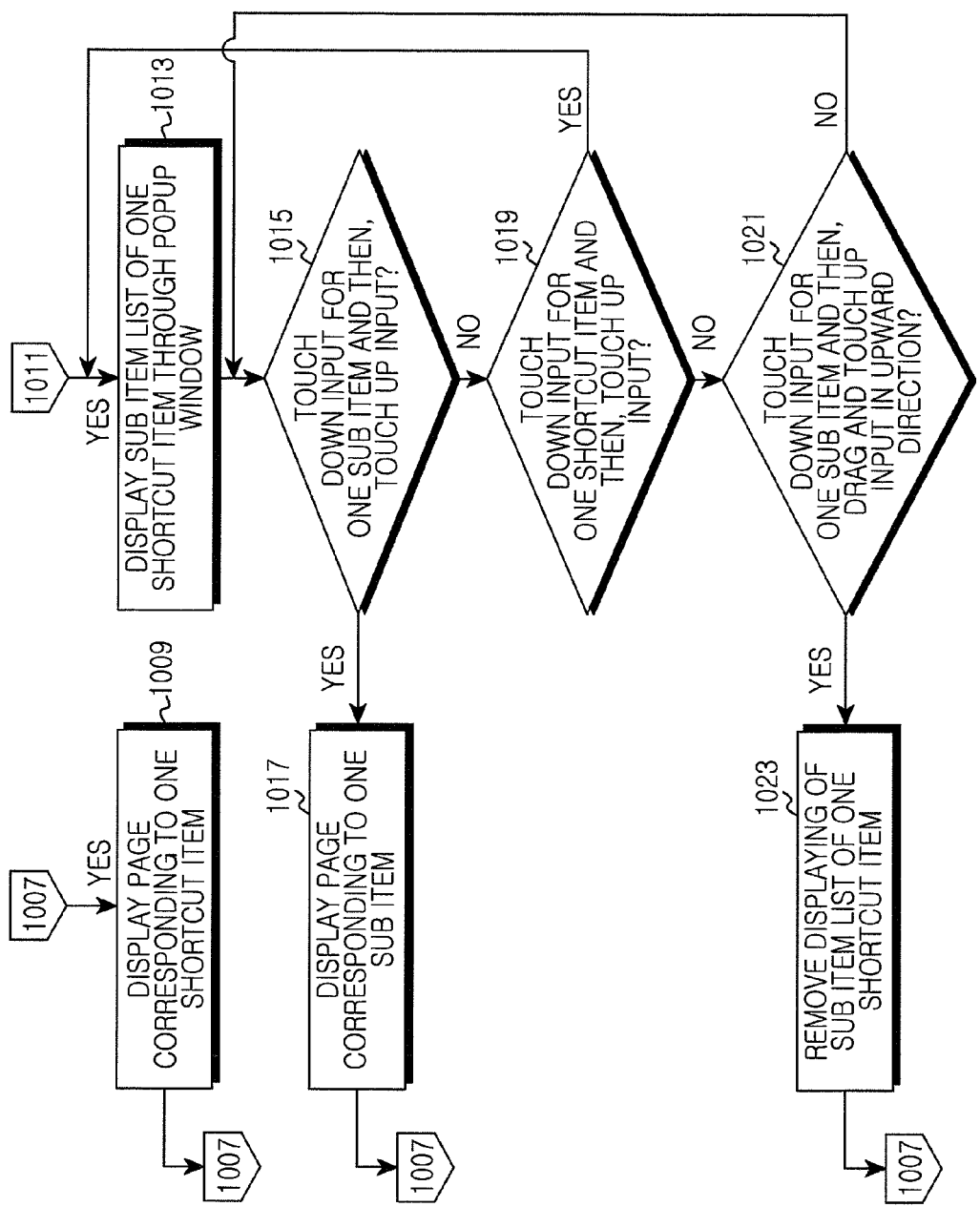
Figure 10C:
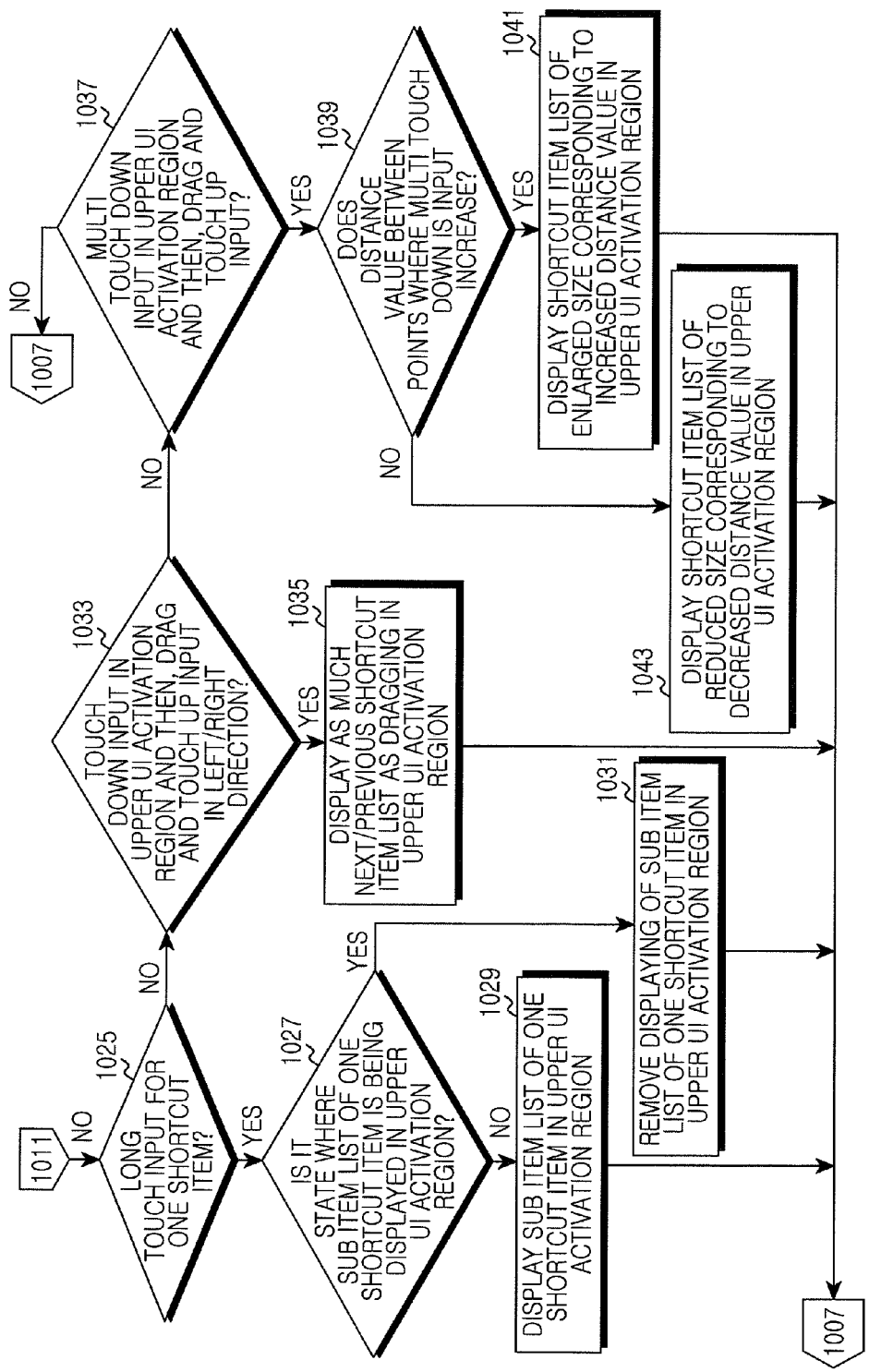

FIGS. 10A-10C illustrate a process for supporting a shortcut for an e-book in a portable terminal having an e-book function according to the fourth embodiment of the present invention.

Referring to PIGS. 10A-10C, in step 1001, the terminal determines whether a request for execution of an e-book function of a concavo-convex mode is sensed according to user's key manipulation. This can be determined by identifying whether a touch (i.e., touch up after touch down) for a shortcut On switch is sensed. Here, the shortcut On switch can be, for example, positioned left in a predetermined upper UI activation region of an e-book, and can be displayed in a document shape. According to an embodiment, the shortcut On switch may be realized as one switch performing both functions of a shortcut On switch and a shortcut Off switch (e.g. a shortcut On/Off toggle switch). In this situation, when a user touches the switch in a shortcut Off state, the switch transits to a shortcut On state and accordingly, a shortcut function is activated and the e-book function of the concavo-convex mode is executed. When the user touches the switch in the shortcut On state, the switch transits to the shortcut Off state and accordingly, the shortcut function is deactivated and the e-book function of the concavo-convex mode is execution-terminated.

When the request for execution of the e-book function of the concavo-convex mode is sensed in step 1001, the terminal executes the e-book function in the concavo-convex mode supporting the shortcut in step 1003.

In step 1005, the terminal displays a preset page of an e-book selected by a user according to setting information of the e-book function and displays a shortcut item list in the upper UI activation region of the e-book. For example, the setting information of the e-book function can be preset to display the first page of a corresponding e-book or display the previously last displayed page of the corresponding e-book at the time of execution of the e-book function.

In step 1007, the terminal determines whether a touch down is input for one shortcut item among the shortcut item list displayed in the upper UI activation region of the e-book according to a user's key manipulation and then, while the touch down is input, a drag and touch up is input in the left/right direction. Here, by distinguishing the one shortcut item and the remnant shortcut items through colors, patterns, and such, the terminal can inform a user that the touch down is input for the one shortcut item. Furthermore, the terminal can inform the user that the touch down is input for the one shortcut item, through a voice, a vibration, and such.

When it is determined in step 1007 that the touch down is input for the one shortcut item among the shortcut item list displayed in the upper UI activation region of the e-book and then, while the touch down is input, the drag and touch up is input in the left/right direction, the terminal determines that there is a request for a shortcut to a corresponding page and, in step 1009, displays the page corresponding to the one shortcut item on a screen and then, returns to step 1007. Here, the terminal can inform a user of quick moving to the page corresponding to the one shortcut item, through a voice, a vibration, and such.

In contrast, when it is not determined in step 1007 that the touch down is input for the one shortcut item among the shortcut item list displayed in the upper UI activation region of the e-book and then, while the touch down is input, the drag and touch up is input in the left/right direction, in step 1011, the terminal determines whether a touch down is input for one shortcut item among the shortcut item list displayed in the upper UI activation region of the e-book according to the user's key manipulation and then, while the touch down is input, a drag and touch up is input in the downward direction.

When it is determined in step 1011 that the touch down is input for the one shortcut item among the shortcut item list displayed in the upper UI activation region of the e-book and then, while the touch down is input, the drag and touch up is input in the downward direction, in step 1013, the terminal displays a sub item list of the one shortcut item on the screen through a popup window and then, proceeds to step 1015. For example, when the one shortcut item is Chapter 5, the sub item list can be composed of Chapters 5-1, 5-2, 5-3 and so forth, and in the popup window, the sub item list, a title of each sub item and such, can be displayed.

In step 1015, the terminal determines whether a touch down is input for one sub item among the sub item list displayed on the screen through the popup window according to a user's key manipulation and then, while the touch down is input, a touch up is input. Here, by distinguishing the sub item for which the touch down is currently input and the remnant sub items among the sub item list through colors, patterns, and such, the terminal can inform a user of the sub item for which the touch down is currently input. Furthermore, the terminal can inform the user of information on the sub item for which the touch down is currently input among the sub item list through a voice, a vibration, and such. For example, the terminal can output "Title of Chapter 5-1 is [Understanding of Physics]", through a voice.

When it is determined in step 1015 that the touch down is input for the one sub item among the sub item list displayed on the screen through the popup window and then, while the touch down is input, the touch up is input, in step 1017, the terminal displays a page corresponding to the one sub item on the screen. Here, the terminal can inform a user of quick moving to the page corresponding to the one sub item.

In contrast, when it is determined in step 1015 that the touch down is input for the one sub item among the sub item list displayed on the screen through the popup window and then, while the touch down is input, the touch up is not input, in step 1019, the terminal determines whether a touch down is input for one shortcut item among the shortcut item list displayed in the upper UI activation region of the e-book according to a user's key manipulation and then, while the touch down is input, a touch up is input.

When it is determined in step 1019 that the touch down is input for the one shortcut item among the shortcut item list displayed in the upper UI activation region of the e-book and then, while the touch down is input, the touch up is input, the terminal returns to step 1013 and repeatedly performs the subsequent steps.

In contrast, when it is determined in step 1019 that the touch down is input for the one shortcut item among the shortcut item list displayed in the upper UI activation region of the e-book and then, while the touch down is input, the touch up is not input, in step 1021, the terminal determines whether a touch down is input for one sub item among the sub item list displayed on the screen through the popup window according to a user's key manipulation and then, while the touch down is input, a drag and touch up is input in the upward direction.

When it is determined in step 1021 that the touch down is input for the one sub item among the sub item list displayed on the screen through the popup window according to the user's key manipulation and then, while the touch down is input, the drag and touch up is input in the upward direction, in step 1023, the terminal removes the displaying of the sub item list of the one shortcut item through the popup window on the screen and then, returns to step 1007. Here, the terminal can inform a user of removing the displaying of the sub item list of the one shortcut item through the popup window on the screen through a voice, a vibration, and such. Alternatively, the terminal may determine whether a touch down is input for the remnant regions excepting a region of a screen where a sub item list is displayed and then, while the touch down is input, a touch up is input and, when the touch down is input for the remnant regions excepting the region of the screen where the sub item list is displayed and then, while the touch down is input, a touch up is input, the terminal may remove the displaying of the sub item list of the one shortcut item through the popup window on the screen.

In contrast, when it is determined in step 1021 that the touch down is input for the one sub item among the sub item list displayed on the screen through the popup window and then, while the touch down is input, the drag and touch up is not input in the upward direction, the terminal returns to step 1015.

In contrast, when it is determined in step 1011 that the touch down is input for the one shortcut item among the shortcut item list displayed in the upper UI activation region of the e-book and then, while the touch down is input, the drag and touch up is not input in the downward direction, in step 1025, the terminal determines whether a long touch is input for one shortcut item among the shortcut item list displayed in the upper UI activation region of the e-book according to the user's key manipulation.

When it is determined in step 1025 that the long touch is input for the one shortcut item among the shortcut item list displayed in the upper UI activation region of the e-book according to the user's key manipulation, in step 1027, the terminal determines whether it is a state where a sub item list of the one shortcut item is being displayed in the upper UI activation region of the e-book according to the user's key manipulation.

Figure 11A:
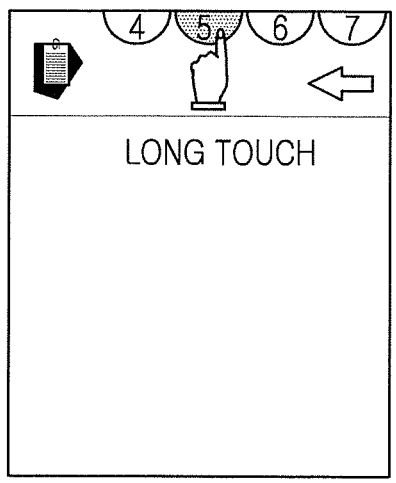
FIGS. 11A and 11B are example diagrams of a process for supporting shortcut for an e-book in a portable terminal having an e-book function according to an embodiment of the present invention.
Figure 11B:
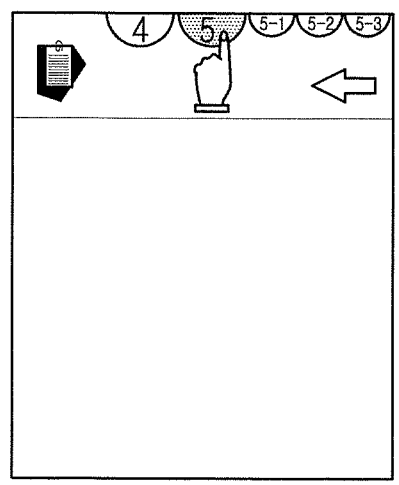

When it is determined in step 1027 that the terminal is not in the state in which the sub item list of the one shortcut item is being displayed in the upper UI activation region of the e-book, in step 1029, the terminal displays the sub item list of the one shortcut item in the upper UI activation region of the e-book and then, returns to step 1007. For example, as shown in FIGS. 11A and 11B, the sub item list of the one shortcut item can be displayed in a size smaller than the shortcut item list between the one shortcut item and a next shortcut item. Here, the terminal can inform a user of displaying a sub item list of the one shortcut item in the upper UI activation region of the e-book through a voice, a vibration, and such.

In contrast, when it is determined in step 1027 that the terminal is in the state in which the sub item list of the one shortcut item is being displayed in the upper UI activation region of the e-book, in step 1031, the terminal removes the displaying of the sub item list of the one shortcut item in the upper UI activation region of the e-book and then, returns to step 1007. Here, the terminal can inform a user of removing the displaying of the sub item list of the one shortcut item in the upper UI activation region of the e-book through a voice, a vibration, and such.

In contrast, when it is determined in step 1025 that the long touch is not input for the one shortcut item among the shortcut item list displayed in the upper UI activation region of the e-book, in step 1033, the terminal determines whether a touch down is input in the upper UI activation region of the e-book according to the user's key manipulation and then, while the touch down is input, a drag and touch up is input in the left/right direction.

When it is determined in step 1033 that the touch down is input in the upper UI activation region of the e-book and then, while the touch down is input, the drag and touch up is input in the left/right direction, in step 1035, the terminal displays the next/previous shortcut item list according to the dragging in the upper UI activation region of the screen and then, returns to step 1007. For example, when the shortcut item list currently displayed on the screen is Chapters 4, 5, 6 and 7, Chapters 2, 3, 4, and 5 listed in a previous shortcut item list can be displayed according to the dragging on the screen. Here, the terminal can inform a user of moving to the next/previous shortcut item list through a voice, a vibration, and such.

In contrast, when it is not determined in step 1033 that the touch down is input in the upper UI activation region of the e-book and then, while the touch down is input, the drag and touch up is input in the left/right direction, in step 1037, the terminal determines whether a multi touch down is input in the upper UI activation region of the e-book according to the user's key manipulation and then, while the multi touch down is input, a drag and touch up is input.

When it is determined in step 1037 that the multi touch down is input in the upper UI activation region of the e-book and then, while the multi touch down is input, the drag and touch up is input, in step 1039, the terminal determines whether a distance value between points where the multi touch down is input increases.

When it is determined in step 1039 that the distance value between the points where the multi touch down is input increases, in step 1041, the terminal displays a shortcut item list of an enlarged size corresponding to the increased distance value in the upper UI activation region of the screen and then, returns to step 1007. Here, the terminal can inform a user of the displaying of the shortcut item list of the enlarged size through a voice, a vibration, and such. For example, when the shortcut item list currently displayed on the screen is Chapters 4, 5, 6, and 7, among them, Chapters 5 and 6 can be displayed in the enlarged size on the screen.

In contrast, when it is determined in step 1039 that the distance value between the points where the multi touch down is input decreases, in step 1043, the terminal displays a shortcut item list of a reduced size corresponding to the decreased distance value in the upper UI activation region of the screen and then, returns to step 1007. Here, the terminal can inform a user of the displaying of the shortcut item list of the reduced size through a voice, a vibration, and such. For example, when the shortcut item list currently displayed on the screen is Chapters 4, 5, 6, and 7, Chapters 2, 3, 4, 5, 6, 7, 8, and 9 can be displayed in the reduced size on the screen.

In contrast, when it is determined in step 1037 that the multi touch down is input in the upper UI activation region of the e-book and then, while the multi touch down is input, the drag and touch up is not input, the terminal returns to step 1007.

Next, the terminal terminates the process according to the embodiment of the present invention.

FIGS. 11A and 11B are example diagrams of a process for supporting a shortcut for an e-book in a portable terminal having an e-book function according to an embodiment of the present invention.

Referring to FIGS. 11A and 11B, if a long touch is input for one shortcut item among a shortcut item list displayed in an upper UI activation region of an e-book as shown in FIG. 11A, the terminal displays a sub item list of the one shortcut item in the upper UI activation region of the e-book as shown in FIG. 11B. For example, the sub item list of the one shortcut item can be displayed in a size smaller than the shortcut item list between the one shortcut item and a next shortcut item. Here, the terminal can inform a user of the displaying of the sub item list of the one shortcut item in the upper UI activation region of the e-book through a voice, a vibration, and such.

Although not illustrated, if a long touch is input for one shortcut item while a sub item list of the one shortcut item is displayed in an upper UI activation region of an e-book, the terminal removes the displaying of the sub item list of the one shortcut item in the upper UI activation region of the e-book. Here, the terminal can inform a user of removing the displaying of the sub item list of the one shortcut item in the upper UI activation region of the e-book through a voice, a vibration, and such.

As described above, embodiments of the present invention have an advantage that, a user can intuitively navigate pages of contents naturally with gestures that are similar to turning pages of a book, by providing a UI for turning e-book pages in an analog manner in a portable terminal having an e-book function.

While the invention has been shown and described with reference to certain preferred embodiments thereof, it will be understood by those skilled in the art that various chances in form and details may be made therein without departing from the spirit and scope of the invention as defined by the appended claims.

What is claimed is:

1. A method for turning electronic book (e-book) pages in a portable terminal having an e-book function, the method comprising:
displaying a page of an e-book on a screen, the page including a right user interface (UI) activation region, a left UI activation region, and an upper UI activation region;
upon detecting a touch on either the right UI activation region or the left UI activation region:
displaying a right side of the e-book in response to detecting the touch on the right UI activation region, or displaying a left side of the e-book in response to detecting the touch on the left UI activation region;
displaying a preceding page of the page, when the touch is dragged in a right direction and released after the touch is input in the left UI activation region, or displaying a next page of the page, when the touch is dragged in a left direction and released after the touch is input in the right UI activation region; and
displaying a number of pages to be turned according to an amount of a movement of the dragged touch in the right side of the e-book while the dragged touch is being moved, when the touch is dragged in the right direction while the touch is input in the right UI activation region, or displaying a number of pages to be turned according to an amount of a movement of the dragged touch in the left side of the e-book while the dragged touch is being moved, when the touch is dragged in the left direction while the touch is input in the left UI activation region, the number is being displayed at a position adjacent to the dragged touch on the right or left side of the e-book;
displaying a subsequent page corresponding to the number of pages to be turned, when the touch is dragged in the left direction after the touch is dragged in the right direction, or displaying a previous page corresponding to the number of pages to be turned, when the touch is dragged in the right direction after the touch is dragged in the left direction; and
upon detecting a touch on an icon for operating shortcut mode included in the upper UI activation region;
displaying a plurality of shortcut icons in the upper UI activation region, each of the plurality of the shortcut icons is being associated with a respective page of the e-book;
in response to detecting a touch on a shortcut icon among the plurality of the shortcut icons, switching from the page of the e-book displayed on the screen to a page of the e-book corresponding to the shortcut icon; and
in response to the displaying of the page of the e-book corresponding to the shortcut icon, outputting a notification indicating that the page of the e-book corresponding to the shortcut icon is displayed.

2. The method of claim 1, further comprising:
determining a right partial region of the screen as the right UI activation region; and
determining a left partial region of the screen as the left UI activation region.

3. An apparatus for displaying electronic book (e-book) pages, the apparatus comprising:

a screen configured to display a page of an e-book, the page including a right user interface (UI) activation region, a left UI activation region, and an upper UI activation region; and a hardware controller configured to:

upon detecting a touch on either the right UI activation region or the left UI activation region:
  display a right side of the e-book in response to detecting the touch on the right UI activation region or display a left side of the e-book in response to detecting the touch on the left UI activation region;
  display a preceding page of the page, when the touch is dragged in a right direction and released after the touch is input in the left UI activation region, or display a next page of the page, when the touch is dragged in a left direction and released after the touch is input in the right UI activation region; and
  display a number of pages to be turned according to an amount of a movement of the dragged touch toward the right side of the e-book while the dragged touch is being moved, when the touch is dragged in the right direction while the touch is input in the right UI activation region, or display a number of pages to be turned according to an amount of a movement of the dragged touch toward the left side of the e-book while the dragged touch is being moved, when the touch is dragged in the left direction while the touch is input in the left UI activation region, the number is being displayed at a position adjacent to the dragged touch on the right or left side of the e-book;
  display a subsequent page corresponding to the number of pages to be turned, when the touch is dragged in the left direction after the touch is dragged in the right direction, or display a previous page corresponding to the number of pages to be turned, when the touch is dragged in the right direction after the touch is dragged in the left direction; and upon detecting a touch on an icon for operating shortcut mode included in the upper UI activation region:
  display a plurality of shortcut icons in the upper UI activation region, each of the plurality of the shortcut icons is being associated with a respective page of the e-book;
  in response to detecting a touch on a shortcut icon among the plurality of the shortcut icons, switch from the page of the e-book displayed on the screen to a page of the e-book corresponding to the shortcut icon; and
  in response to the displaying of the page of the e-book corresponding to the shortcut icon, output a notification indicating that the page of the e-book corresponding to the shortcut icon is displayed.

4. The apparatus of claim 3, wherein the hardware controller is further configured to:
  determine a right partial region of the screen as a right UI activation region, and
  determine a left partial region of the screen as a left UI activation region.

\* \* \* \* \*